(12) United States Patent
Shima et al.

(10) Patent No.: US 6,354,274 B1
(45) Date of Patent: Mar. 12, 2002

(54) FUEL INJECTION APPARATUS FOR INTERNAL COMBUSTION ENGINE

(75) Inventors: Nobuhiko Shima, Kariya; Takashi Kikutani, Ama-gun; Hitoshi Kato, Nagoya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/712,974

(22) Filed: Nov. 16, 2000

(30) Foreign Application Priority Data

Nov. 17, 1999 (JP) .............................. 11-326911
Nov. 26, 1999 (JP) .............................. 11-335984

(51) Int. Cl.[7] .............................................. F02M 51/06
(52) U.S. Cl. ...................... 123/478; 123/490; 701/105
(58) Field of Search .......................... 123/299, 478, 123/490; 701/104, 105

(56) References Cited

U.S. PATENT DOCUMENTS 5,947,098 A * 9/1999 Hosokawa et al. ......... 123/679
6,102,009 A * 8/2000 Nishiyama .................. 123/490
6,170,459 B1 * 1/2001 Ono et al. .................. 123/478
6,236,931 B1 * 5/2001 Poggio et al. .............. 701/105
6,298,830 B1 * 10/2001 Kono .......................... 701/105

FOREIGN PATENT DOCUMENTS

| GB | 2 326 742 | | 12/1998 |
| JP | 3-18645 | | 1/1991 |
| JP | 5-125985 | | 5/1993 |
| JP | 10176563 A | * | 6/1998 |

* cited by examiner

Primary Examiner—Erick Solis
(74) Attorney, Agent, or Firm—Nixon & Vanderhye P.C.

(57) ABSTRACT

An ECU calculates a command injection amount based on a driving condition, and calculates an injection timing based on a detected fuel pressure. Further, the ECU calculates a provisional injection period, and calculates again an injection period based on the injection timing fuel pressure and the command injection amount when the injection timing fuel pressure is correctly detected.

12 Claims, 18 Drawing Sheets

FUEL INJECTION APPARATUS FOR INTERNAL COMBUSTION ENGINE

CROSS REFERENCE TO RELATED APPLICATION

This application is based on and incorporates herein by reference Japanese Patent Application Nos. Hei. 11-326911 filed on Nov. 17, 1999, and Hei. 11-335984 filed on Nov. 26, 1999.

BACKGROUND OF THE INVENTION

1. Field of the Invention

The present invention relates to a fuel injection system supplying high-pressure fuel to an injector, which is suitable for use in a vehicle.

2. Description of Related Art

In a diesel internal combustion engine, an ECU calculates a command injection timing and a command injection amount of fuel based on an engine load such as a rotation number, an accelerate opening degree, and the like.

In a pressure accumulating fuel injection system in which a fuel is supplied from a pressure accumulating pipe to an injector, a fuel pressure inside the accumulating pipe is detected, and an ECU calculates an injection timing and an injection amount based on the fuel pressure, the command injection timing, and the command injection amount. The ECU controls to energize the injector based on the injection timing, the injection amount, and a pulse output from a rotation number sensor.

In JP-A-3-18645, as shown in FIGS. 13 and 24, a fuel pressure NPC inside an accumulating pipe is detected when an predetermined pulse is output from a rotation number sensor. An ECU calculates an injection timing including an injection timing pulse number CNECAMF and a redundant time TTMF, and an injection period TQMF based on the detected fuel pressure NPC.

That is, as shown in FIGS. 13 and 24, the ECU calculates the injection timing based on a command injection timing TFIN from a top dead center TDC and an injection delay time TDM attained based on the fuel pressure NPC. The command injection timing TFIN is attained by angle (° CA). For example, the ECU defines the predetermined pulse as a control initial position, and calculates the injection timing from the control initial position. The ECU counts pulses from the control initial position and times the redundant time TTMF to control the injection timing.

Thus, since the ECU has to calculate the injection timing before the ECU starts to count the pulses at latest, the fuel pressure NPC inside the accumulating pipe has to be detected before the injection timing calculation. Similarly, the ECU calculates the injection period TQMF before the ECU starts the pulse count.

When a pilot injection is executed, the ECU calculates a pilot injection timing including a pilot injection timing pulse number CNECAPF and a redundant time TTPF based on the command injection timing TFIN, an interval TINT, an injection completion delay time TDEP, and a pilot injection period TQPF. Thus, since the ECU has to calculate a pilot injection period TQPF based on the fuel pressure NPC before the control initial position, the fuel pressure has to be detected before the control initial position at latest.

However, the fuel pressure inside the accumulating pipe fluctuates due to a fuel press feeding from a high-pressure fuel supply pump. Thus, especially at a transitional driving such as acceleration, a difference between a calculated injection amount and an actual injection amount from the injector arises due to a pressure difference between the detected fuel pressure and an actual injection timing fuel pressure.

For reducing the difference, in JP-A-5-125985, a fuel pressure inside an accumulating pipe is detected when an ECU stops energizing an injector, and an injection timing and an injection period at a next cylinder are calculated based on the detected fuel pressure.

However, even in JP-A-5-125985, since the calculation is one injection behind, a pressure difference between the detected fuel pressure in a previous cylinder and an actual fuel pressure in a next cylinder is increased to cause a large difference between a calculated command injection amount and an actual injection amount.

SUMMARY OF THE INVENTION

An object of the present invention is to reduce a difference between a calculated command injection amount and an actual injection amount in a pressure accumulating type fuel injection apparatus.

According to a first aspect of the present invention, an injection period is calculated based on an injection timing fuel pressure at injection timing. Thus, the injection period can be attained based on the actual fuel pressure at the injection timing. Thus, the difference between the calculated injection amount and the actual injection amount is reduced.

According to a second aspect of the present invention, a provisional injection period is calculated, and the injection period is calculated again when the injection timing fuel pressure is correctly detected. Thus, the injection amount does not abruptly change even when the fuel pressure is not correctly detected.

According to a third aspect of the present invention, a correction is calculated based on the injection timing fuel pressure, an anticipated pressure is calculated based on the correction, and the injection period is calculated based on the anticipated pressure. Thus, a difference between the calculated injection period and an actually required injection period is reduced.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS (First Embodiment)

Figure 1:
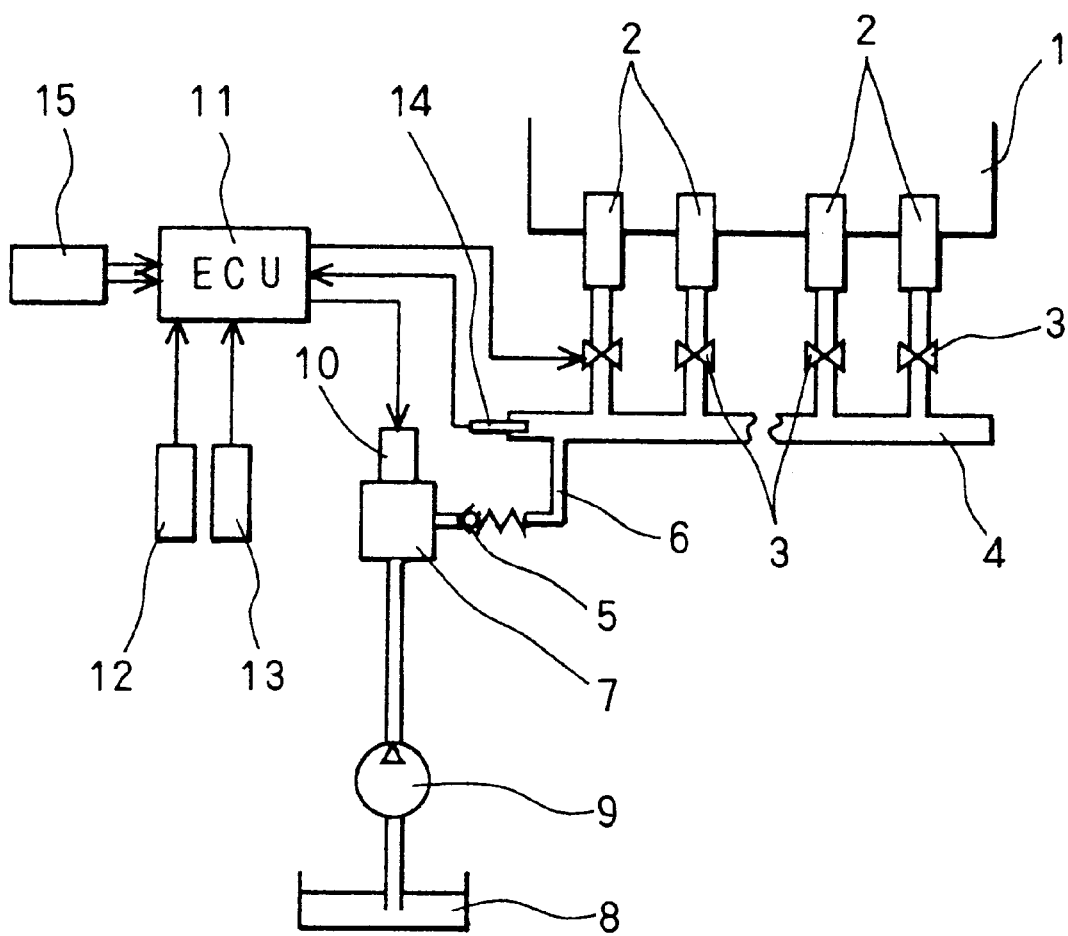
FIG. 1 is a schematic view a pressure accumulating fuel injection system according to the present invention.

As shown in FIG. 1, a diesel internal combustion engine 1 includes an injector 2 for a combustion chamber of each cylinder. An injection control electromagnetic valve 3 on/off controls a fuel injection from the injector 2 to the engine 1. Each injector 2 connects with a high-pressure accumulating pipe 4 commonly used for each cylinder. When the injection control valve 3 opens, fuel in the accumulating pipe 4 is injected into the engine 1 through the injector 2.

The injector 2 includes a needle opening/closing a nozzle and a back-pressure chamber at the back pressure side thereof, on which fuel pressure in the accumulating pipe 4 acts. The injection control valve 3 is provided between the back pressure chamber and a low pressure side. When the injection control valve 3 closes, the fuel pressure inside the back pressure chamber allows the needle to close the nozzle. When the injection control valve 3 opens, the fuel pressure inside the back pressure chamber is released to the low pressure side, so that the needle opens the nozzle to inject the fuel. Therefore, a fuel of which pressure corresponds to fuel injection pressure needs to be continuously accumulated in the accumulating pipe 4. The accumulating pipe 4 connects to a high pressure supply pump 7 through a supply pipe 6 including a check valve 5.

The high-pressure pump 7 suctions the fuel from a fuel tank 8 through a fuel supply pump 9. The high-pressure pump 7 includes a cam synchronizing the rotation of the engine 1 to make a plunger reciprocate, compresses the fuel to a required high pressure and supplies it into the accumulating pipe 4. The high-pressure pump 7 further includes a discharge amount controller 10.

An ECU 11 controls the operations of the injection control valve 3 and the discharge amount controller 10. Detection signals from a rotation number sensor 12 and an accelerate opening degree sensor 13 are input into the ECU 11, and input-signals from a pressure sensor 14 detecting the fuel pressure in the accumulating pipe 4 and miscellaneous sensors 15 detecting a water temperature, an intake air temperature, an intake air pressure and the like are input into the ECU 11.

The ECU 11 determines a driving condition of the engine 1 based on the detection and inputs signals, and outputs control signals into the injection control valve 3 and the discharge amount controller 10. The ECU 11 includes memories (RAM, ROM) memorizing detection data, control programs and the like.

Figure 2:
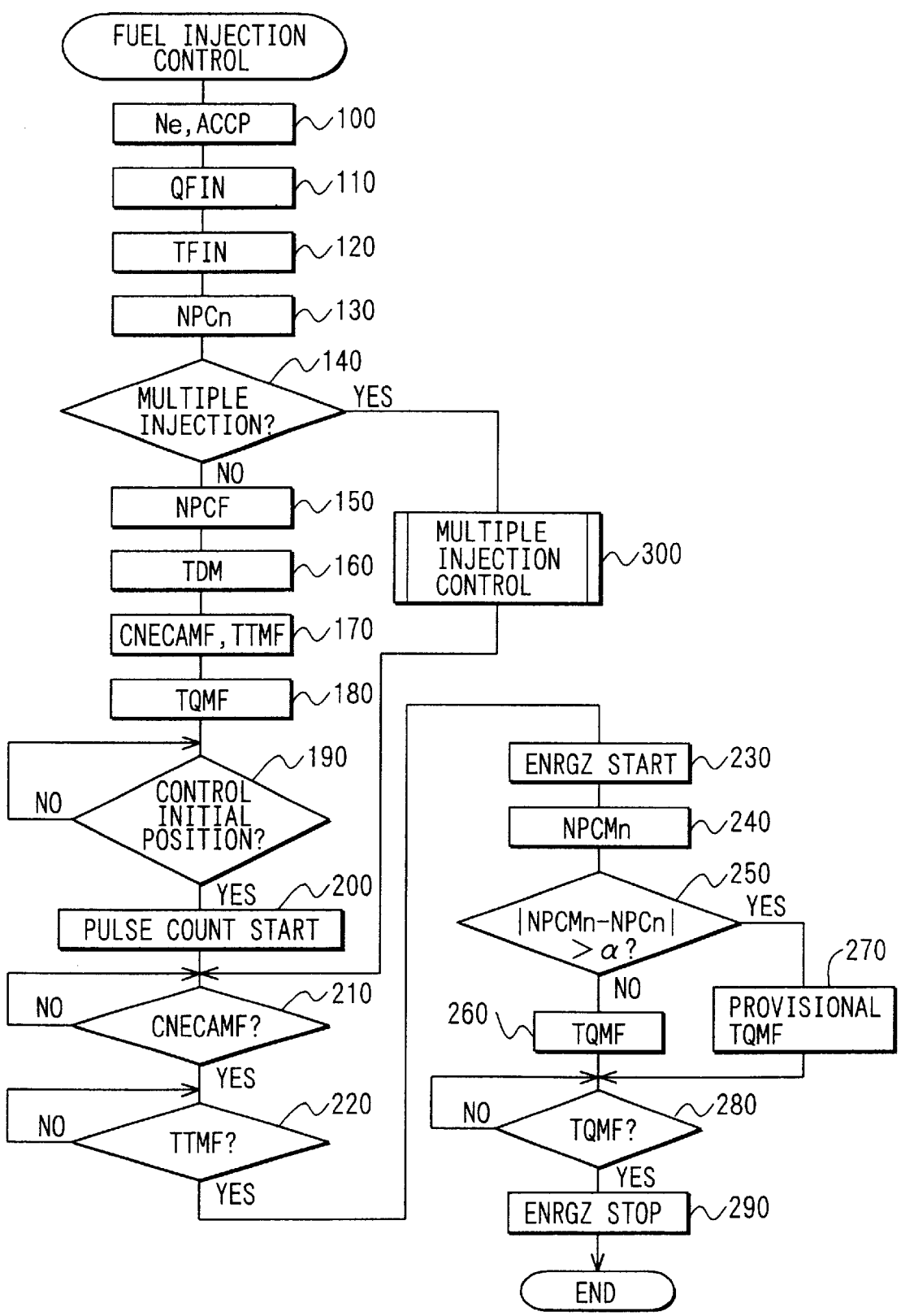
FIG. 2 is a flow chart showing a fuel injection control (first embodiment)
Figure 3:
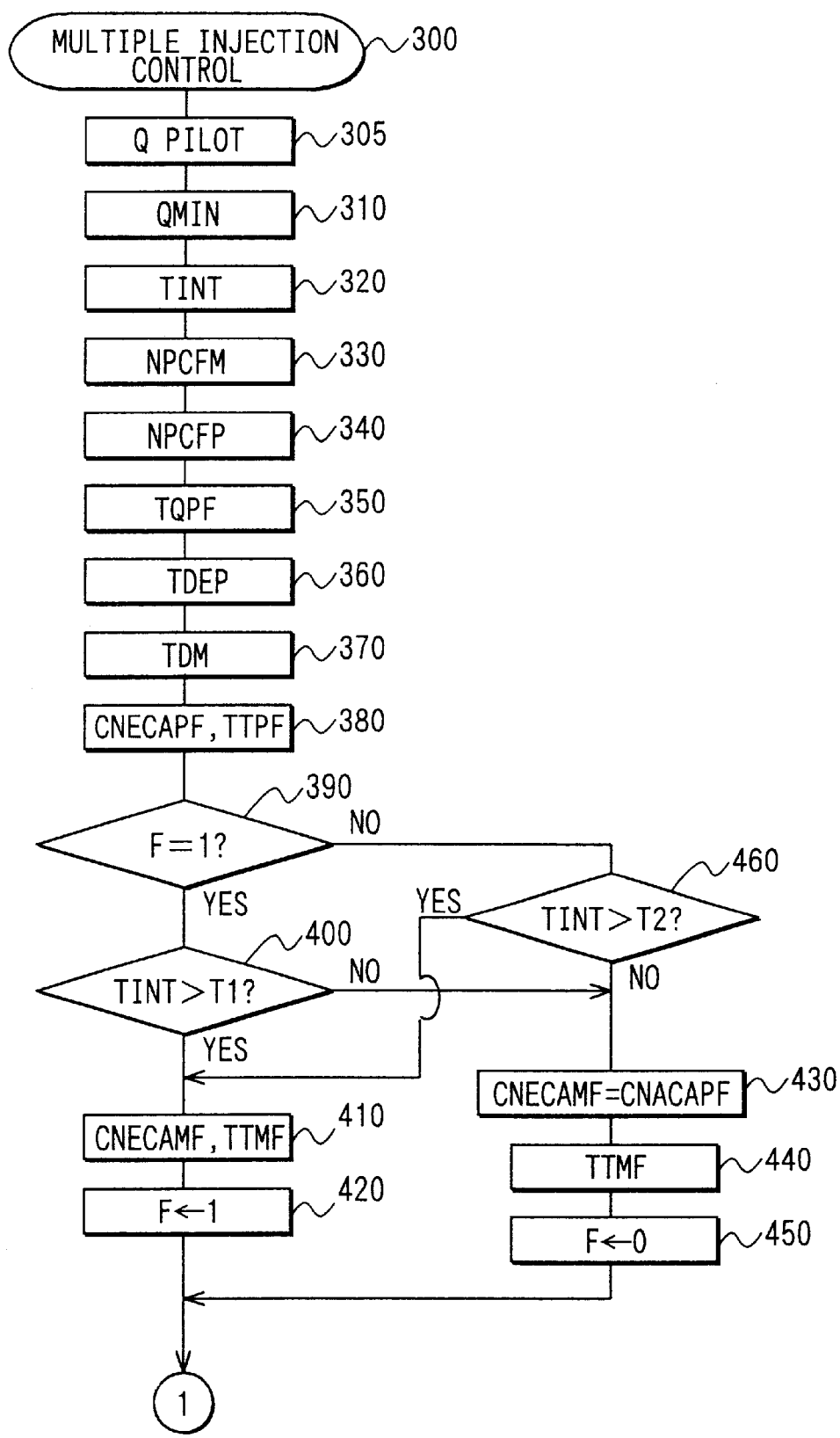
FIG. 3 is a flow chart showing the former half of a multiple injections control (first embodiment)
Figure 4:
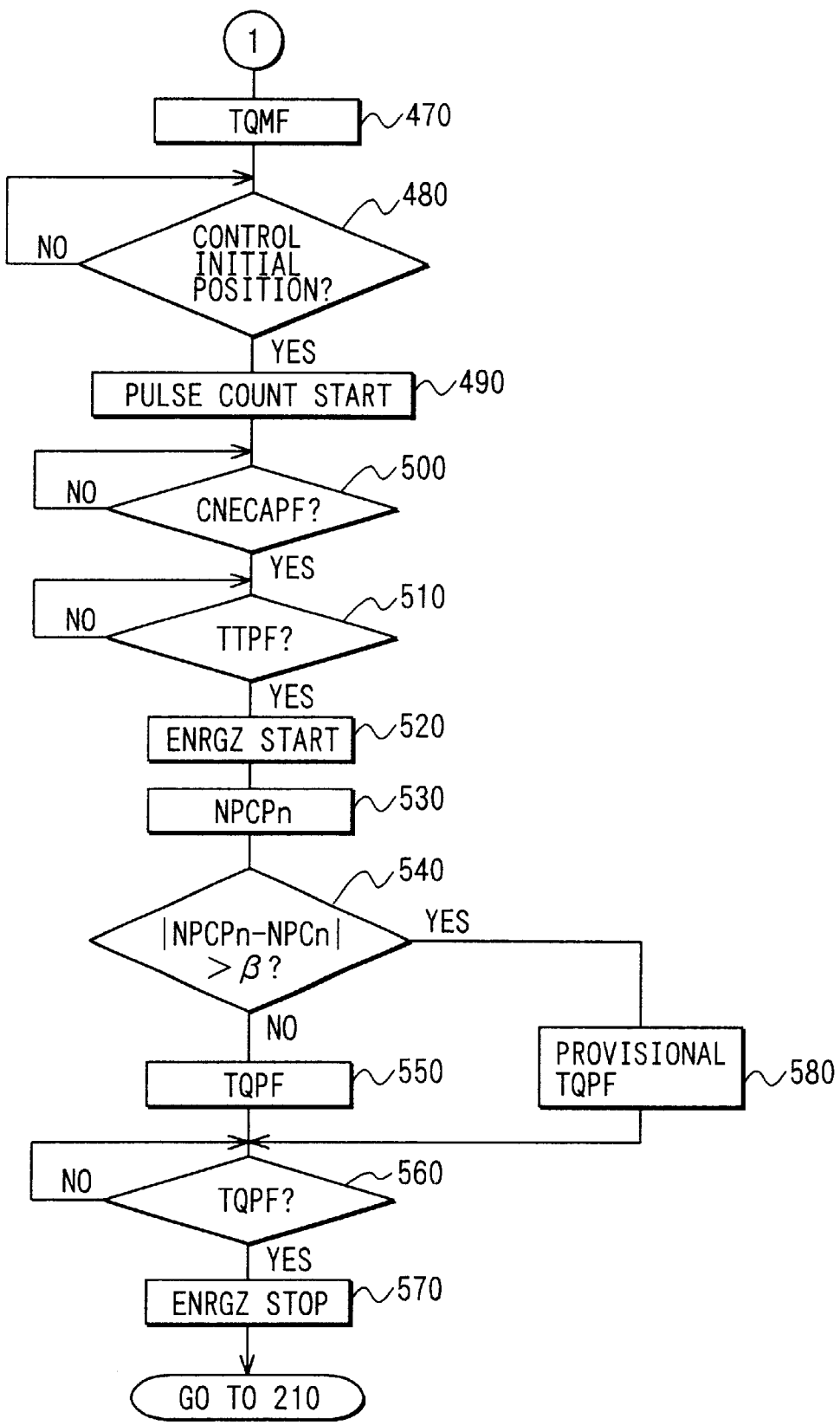
FIG. 4 is a flow chart showing the latter half of the multiple injections control (first embodiment)

A fuel injection control of the ECU 11 in the present embodiment will be explained with reference to FIGS. 2–4.

A rotation number Ne and an accelerate opening degree Accp are input into the ECU 11 through the rotation number sensor 12 and the accelerate opening degree sensor 13 (STEP 100). Next, the ECU 11 calculates a command injection amount QFIN based on the rotation number Ne and accelerate opening degree Accp by using a predetermined program and a characteristic map (STEP 110).

Similarly, the ECU 11 calculates a command injection timing TFIN based on the rotation number Ne and the command injection amount QFIN by using a characteristic map (not illustrated)(STEP 120) A fuel pressure NPCn inside the accumulating pipe 4 is input into the ECU 11 through the pressure sensor 14 (STEP 130). Here, a suffix "n" denotes a current detected data at this routine.

The ECU 11 determines whether it should execute multiple injections in which the fuel is injected with plural times by a pilot injection or not (STEP 140). The ECU 11 may determine it should execute the multiple injections based on the driving condition, or may be previously set by switch.

When the ECU 11 determines it should not execute the multiple injections, the ECU 11 calculates an anticipated pressure NPCF by applying the fuel pressure NPCn at STEP 130 into following expressions (STEP 150).

$$NPCF = NPCn + \Delta PC$$

$$\Delta PC = NPCM_{n-1} - NPC_{n-1}$$

Here, $NPC_{n-1}$ denotes a fuel pressure input into the ECU 11 at STEP 130 of one previous routine. $NPCM_{n-1}$ denotes an injection timing fuel pressure at STEP 240 (described after) of one previous routine.

The pressure difference $\Delta PC$ between $NPC_{n-1}$ and $NPCM_{n-1}$ is almost the same as those at this routine whether at normal or transitional driving. Thus, the anticipated pressure NPCF is calculated by considering the pressure difference $\Delta PC$ to reduce an error at an injection timing of this routine.

Figure 5:
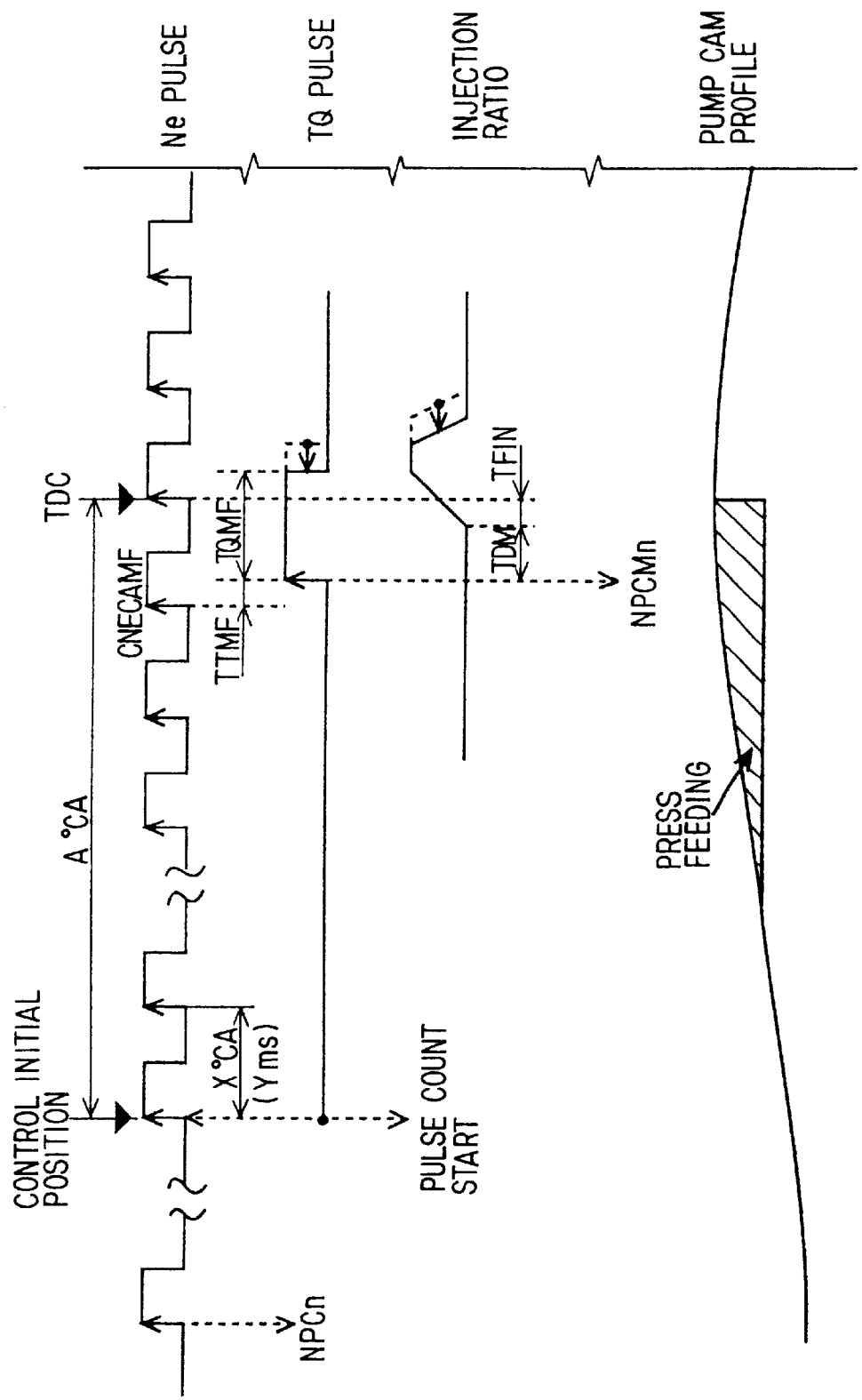
FIG. 5 is a timing chart of the fuel injection (first embodiment)
Figure 6:
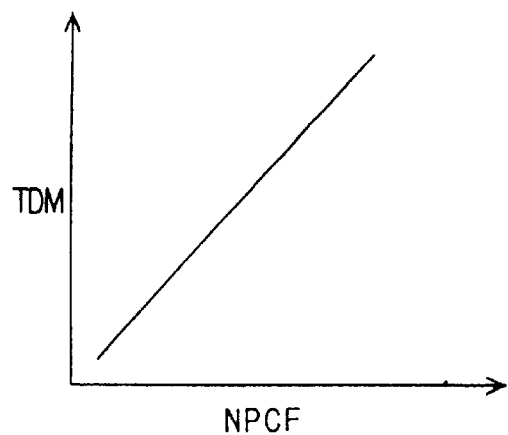
FIG. 6 is a graph showing a relation between an anticipated pressure and an injection delay time (first embodiment)

An injection delay time TDM is calculated based on the anticipated pressure NPCF in accordance with a characteristic map in FIG. 6 (STEP 160). The injection delay time TDM is, as shown in FIG. 5, defined as a time from the injector 2 is energized until the fuel is actually injected. In the injector 2, since the fuel pressure acts on the needle to open the nozzle, the injection delay time varies in accordance with the fuel pressure. The characteristic map can be made by experiments to attain a relation between the fuel pressure and the injection delay time.

An injection timing is calculated based on the command injection timing TFIN at STEP 120 and the injection delay time TDM at STEP 160 (STEP 170). The injection timing is, as shown in FIG. 5, attained from an injection timing pulse number CNECAMF from a control initial position until just before the injection start timing, and a redundant time TTMF from this pulse until the injection start timing.

$$(A-TFIN)/X = CNECAMF + Z$$

$$(Z/X) \times Y - TDM = TTMF$$

If TTMF <0, the following step is executed.

$$CNECAMF \leftarrow CNECAMF - 1$$

$$TTMF \leftarrow TTMF + Y$$

Here, CNECAMF is an integral number, and Z is a redundant. As shown in FIG. 5, A is an angle from the control initial position to a top dead center TDC, and X is an angle corresponding to one pulse output from the rotation number sensor 12. Y is a time while the engine rotates by the angle X by the rotation speed at that time.

Figure 7:
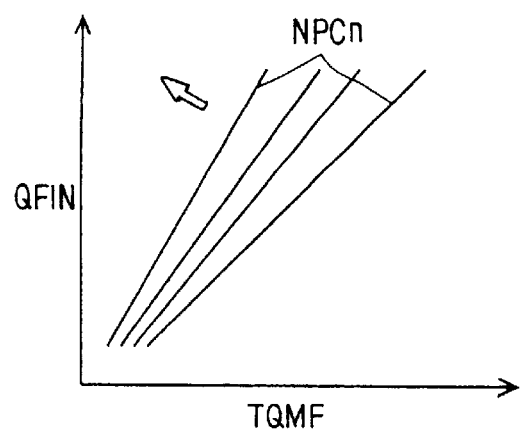
FIG. 7 is a graph showing a relation among an injection period, a fuel pressure, and a command injection amount (first embodiment)

Next, the ECU 11 calculates a provisional injection period TQMF based on the command injection amount QFIN and the anticipated pressure NPCF in accordance with a characteristic map in FIG. 7 (STEP 180). The ECU 11 determines whether it is the control initial position or not based on the output signal from the rotation number sensor 12 (STEP 190). When it is not the control initial position, the ECU 11 waits until it becomes the control initial position. When it is or becomes the control initial position, the ECU 11 starts to count pulses output from the rotation number sensor 12 (STEP 200).

The ECU 11 determines whether the counted pulse number reaches the injection timing pulse number CNECAMF or not (STEP 210). When the counted pulse number does not reach the injection timing pulse number CNECAMF, the ECU 11 waits until it reaches the injection timing pulse number CNECAMF. When it is or reaches the injection timing pulse number CNECAMF, the ECU 11 determines whether the injection timing redundant time TTMF has passed or not (STEP 220).

The ECU 11 waits until the injection timing redundant time TTMF has passed, and when the injection timing redundant time TTMF has passed, the ECU 11 energizes the injector 2 (STEP 230). By this, the fuel pressure acts on the needle in the injector 2 to open the nozzle.

At this time, the injection timing fuel pressure NPCMn inside the accumulating pipe 4 is input into the ECU 11 through the pressure sensor 14 (STEP 240). The ECU 11 determines whether an absolute difference between the injection timing fuel pressure NPCMn and the fuel pressure NPCn at STEP 130 is more than a particular amount α or not (STEP 250).

When the absolute difference is less than the particular amount α, the ECU 11 determines that the injection timing fuel pressure NPCMn is correctly input without being influenced by noise or the like, and the ECU 11 calculates again an injection period TQMF based on the command injection timing amount QFIN and the injection fuel pressure NPCMn in accordance with the characteristic map in FIG. 7 (STEP 260). Here, the particular amount α may be set by experiments.

When the absolute difference is more than the particular amount α, the ECU 11 determines that the injection fuel pressure NPCMn is incorrectly input while being influenced by noise or the like, and the ECU 11 uses the provisional injection period TQMF calculated at STEP 180 (STEP 270).

The ECU 11 determines whether the injection period TQMF has passed or not (STEP 280). The ECU 11 waits until the injection period TQMF has passed, and when the injection period TQMF has passed, the ECU 11 stops energizing the injector 2 (STEP 290). By this, the fuel pressure acts on the needle in the injector 2 to close the nozzle, and the fuel injection is finished. After STEP 290, the present fuel injection control is completed.

As described above, the ECU 11 calculates the injection timing based on the anticipated pressure NPCF, and calculates the injection period TQMF based on the actual injection timing fuel pressure NPCMn. For example, as shown in FIG. 5, the provisional injection period TQMF is calculated as denoted by a broken line. However, when the injection period TQMF is calculated based on the injection timing fuel pressure NPCMn, the injection period TQMF is corrected as denoted by a solid line. Thus, the fuel of which amount is the command injection amount QFIN at STEP 110 is injected even at the transitional driving, thereby reducing the difference between the command injection amount QFIN and the actual injection amount.

When the ECU 11 determines it should execute the multiple injections at STEP 140, the ECU 11 attains the pilot injection amount QPILOT by using a characteristic map (not illustrated) (STEP 305). The ECU 11 calculates a main injection amount QMIN by subtracting the pilot injection amount QPILOT from the command injection amount QFIN at STEP 110 (STEP 310).

$$QMIN \leftarrow QFIN - QPILOT$$

Figure 8:
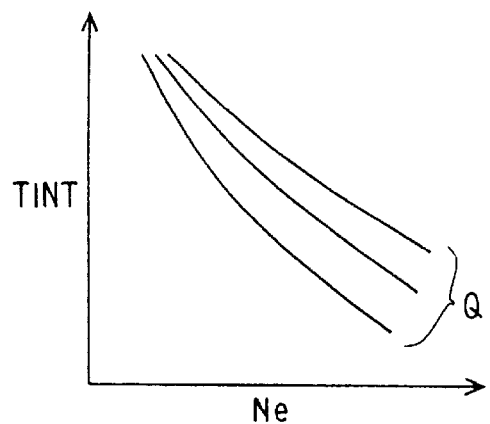
FIG. 8 is a graph showing a relation among a rotation number, an injection amount, and an interval (first embodiment)

Next, the ECU 11 attains an interval TINT (see FIG. 10) between the pilot injection and the main injection based on the rotation number Ne and the command injection amount QFIN in accordance with a characteristic map in FIG. 8 (STEP 320). The ECU 11 calculates an anticipated pressure NPCFM at the main injection by following expression (STEP 330).

$$NPCFM \leftarrow NPCn + (NPCM_{n-1} - NPC_{n-1})$$

Here, MPCn is the fuel pressure inside the accumulating pipe 4 at STEP 130, NPCM$_{n-1}$ is the fuel pressure inside the accumulating pipe 4 at STEP 240 of one previous routine, and NPC$_{n-1}$ is the fuel pressure inside the accumulating pipe 4 at STEP 130 of one previous routine.

The ECU 11 calculates an anticipated pressure NPCFP at the pilot injection by following expression (STEP 340).

$$NPCFP \leftarrow NPCn + (NPCP_{n-1} - NPC_{n-1})$$

Here, NPCP$_{n-1}$ is a fuel pressure inside the accumulating pipe 4 at STEP 530 (described after) of one previous routine.

The ECU 11 calculates a provisional pilot injection period TQPF based on the anticipated pressure NPCFP at STEP 340 and the pilot injection amount QPILOT at STEP 300 in accordance with a characteristic map similar to the map in FIG. 7 (STEP 350).

The ECU 11 calculates a pilot injection completion delay time TDEP based on the anticipated pressure NPCFP and the pilot injection amount QPILOT in accordance with a characteristic map (not illustrated) (STEP 360). The pilot injection completion delay time TDEP defines a time from the injection control valve 3 is disenergized until the fuel injection of the injector 2 is actually completed. The ECU 11 calculates a main injection delay time TDM based on the anticipated pressure NPCFM at the main injection in accordance with a characteristic map in FIG. 6 (STEP 370).

Figure 10:
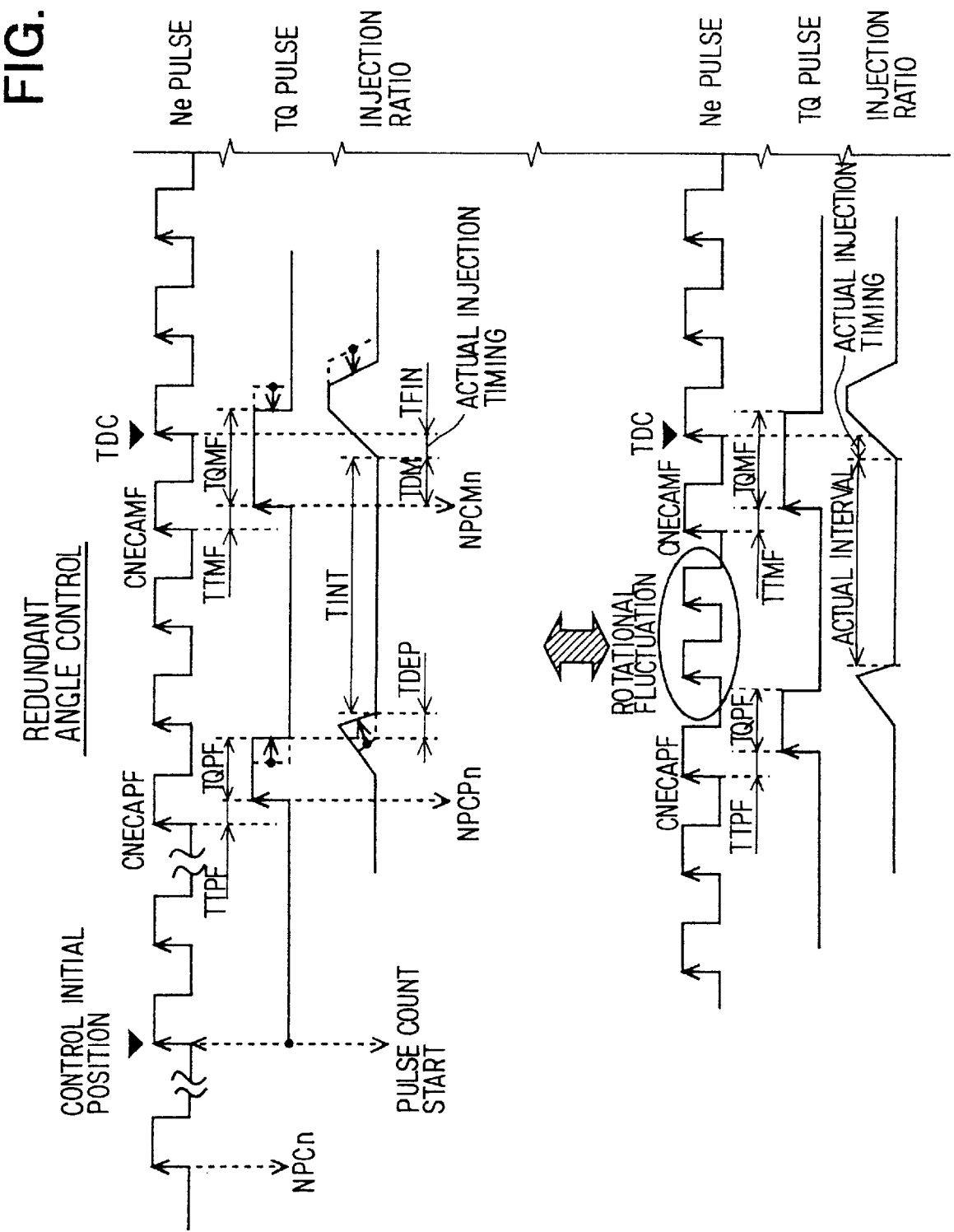
FIG. 10 is a timing chart of multiple injections at the redundant angle control (first embodiment)

The ECU 11 calculates, as shown on FIG. 10, a pilot injection timing pulse number CNECAPF and a pilot injection timing redundant time TTPF based on the command injection timing TFIN, the interval TINT, the pilot injection completion delay time TDEP and the provisional pilot injection period TQPF at STEP 350 (STEP 380). This calculation is done by the same way as in STEP 170 based on the top dead center TDC as criteria.

After that, the ECU 11 determines whether a hunting prevention flag (described after) F is "1" or not (STEP 390). When the flag is "1", the ECU 11 determines the interval TINT is over first threshold T1 or not (STEP 400). When the interval TINT is over the first threshold T1, the ECU 11 calculates a main injection timing pulse number CNECAMF and a main injection timing redundant time TTMF based on the command injection timing TFIN and the main injection delay time TDM (STEP 410). This calculation is done by the same way as in STEP 170 based on the top dead center TDC as criteria. Further, the ECU 11 inputs "1" meaning a redundant angle control is being carried out, into the hunting prevention flag F (STEP 420).

Figure 11:
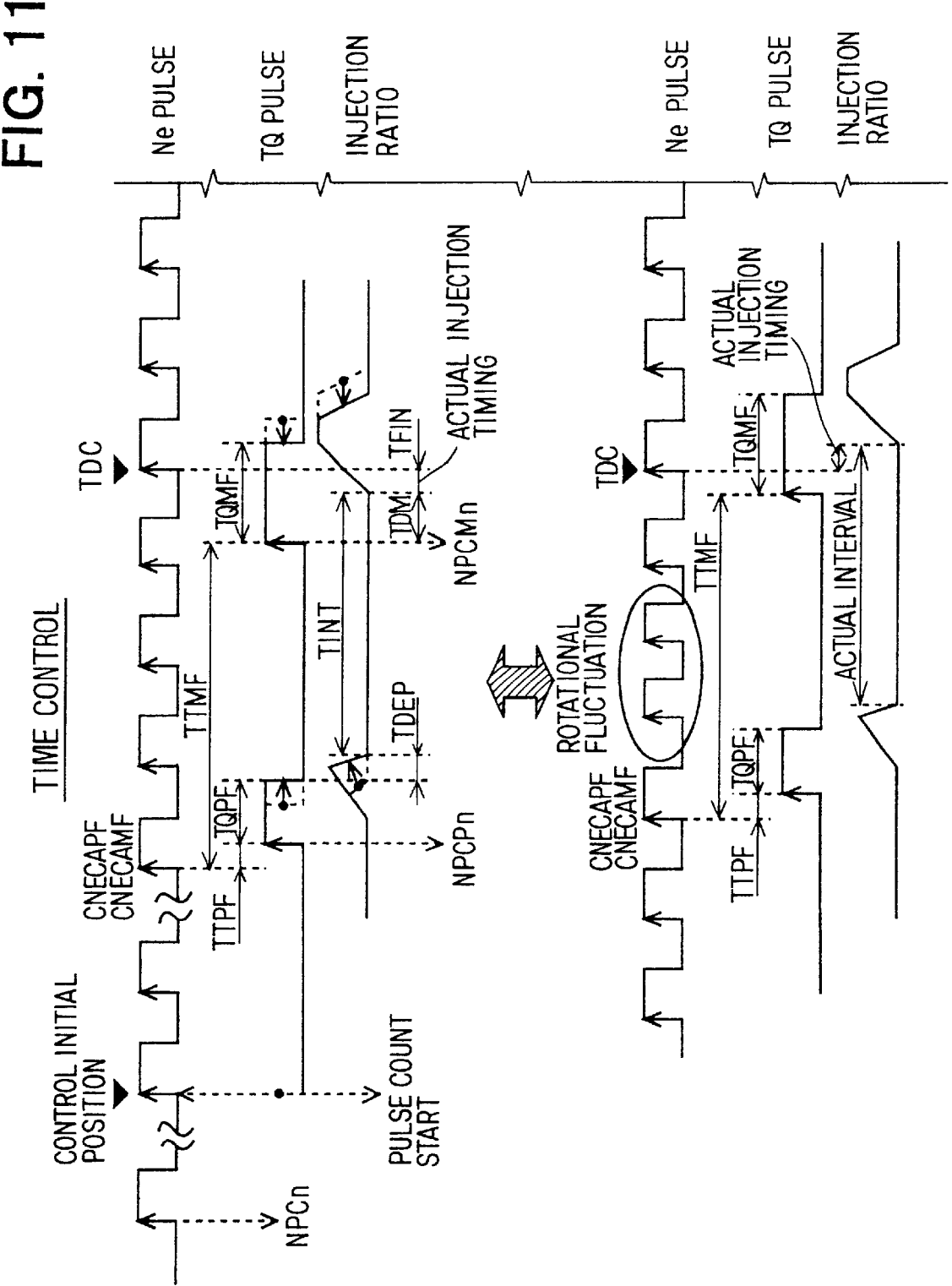
FIG. 11 is a timing chart of multiple injections at the time control (first embodiment)

When the interval TINT is under the first threshold T1, the ECU 11 inputs the pilot injection timing pulse number CNECAPF into the main injection timing pulse number CNECAMF (STEP 430). Next, the ECU 11 calculates, as shown in FIG. 11, a main injection timing redundant time TTMF based on the command injection timing TFIN and the main injection delay time TDM at step 370 (STEP 440). This calculation is done by the same way as in STEP 170. Further, the ECU 11 inputs "0" meaning a time control is being carried out, into the hunting prevention flag F (STEP 450).

Figure 9:
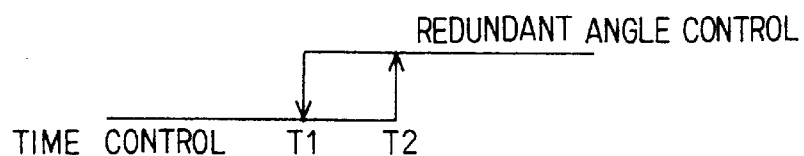
FIG. 9 is a graph explaining a switching operation of a redundant angle control and a time control (first embodiment)

When the flag F is not "1" at STEP 390, the ECU 11 determines whether the interval TINT is over second threshold T2 or not (STEP 460). When the interval TINT is over the second threshold T2, the ECU 11 executes the redundant angle control after STEP 410. When the interval TINT is under the second threshold T2, the ECU 11 executes the time control after STEP 430. As shown in FIG. 9, since the first and second thresholds T1, T2 are used, the redundant angle control and the time control are not frequently switched from each other. Here, switching means of the present invention include STEPS 390, 400, 420, 450 and 460.

After STEP 420 or STEP 450 is completed, the ECU 11 calculates a provisional main injection period TQMF based on the main injection amount QMAIN at STEP 310 and the anticipated pressure NPCFM at the main injection in accordance with a characteristic map similar to the map in FIG. 7 (STEP 470). The ECU 11 determines whether the pulse detected by the rotation number sensor 12 becomes the control initial position or not (STEP 480). When the pulse does not become the control initial position, the ECU 11 waits until it becomes the control initial position.

When it is or becomes the control initial position, the ECU 11 starts to count the pulse number from the control initial position (STEP 490). The ECU 11 determines whether the pulse number reaches the pilot injection timing pulse number CNECAPF or not (STEP 500). When it is not the pilot injection timing pulse number CNECAPF, the ECU 11 waits until it reaches CNECAPF. When it is or becomes CNECAPF, the ECU 11 determines whether the pilot injection timing redundant time TTPF has passed or not (STEP 510).

When the pilot injection timing redundant time TTPF has not passed, the ECU 11 waits until it has passed. When the pilot injection timing redundant time TTPF has passed, the ECU 11 starts to energize the injector 2 (STEP 520). Next, a pilot injection timing fuel pressure NPCPn inside the accumulating pipe 4 at this time is input into the ECU 11 through the pressure sensor 14 (STEP 530). The ECU 11 determines whether an absolute difference between the pilot injection timing fuel pressure NPCPn and the fuel pressure NPCn at STEP 130 is more than a particular amount β or not (STEP 540)

When the absolute difference is less than the particular amount β, the ECU 11 determines that the pilot injection timing fuel pressure NPCPn is correctly input, and the ECU 11 calculates again a pilot injection period TQPF based on this NPCPn as in STEP 350 (STEP 550). The ECU 11 determines whether the pilot injection period TQPF has passed or not (STEP 560) After the TQPF has passed, the ECU 11 stops energizing the injector 2 (STEP 570).

When the absolute difference is more than the particular amount β, the ECU 11 determines that the pilot injection timing fuel pressure NPCPn is incorrectly input while being influenced by noise or the like, and the ECU 11 uses the provisional pilot injection period TQPF calculated at STEP 350 (STEP 580). The ECU 11 determines whether the provisional pilot injection period TQPF has passed or not (STEP 560). After the TQPF has passed, the ECU 11 stops energizing the injector 2 (STEP 570).

The ECU 11 executes steps after STEP 210, and as shown in FIGS. 10 and 11, the ECU 11 calculates again as described above the main injection period TQMF based on the main injection timing fuel pressure NPCMn and executes the main injection. For example, as shown in FIGS. 10 and 11, the provisional pilot injection period TQPF and the provisional main injection period TQMF are calculated as denoted by broken lines. However, when the pilot injection period TQPF and the main injection period TQMF are calculated based on the pilot injection timing fuel pressure NPCPn and the main injection timing fuel pressure NPCMn, the TQPF and the TQMF are corrected as denoted by solid lines. Thus, the fuel of which amount is the command injection amount QFIN at STEP 110 is injected even at the transitional driving, thereby reducing the difference between the command injection amount QFIN and the actual injection amount.

Figure 12:
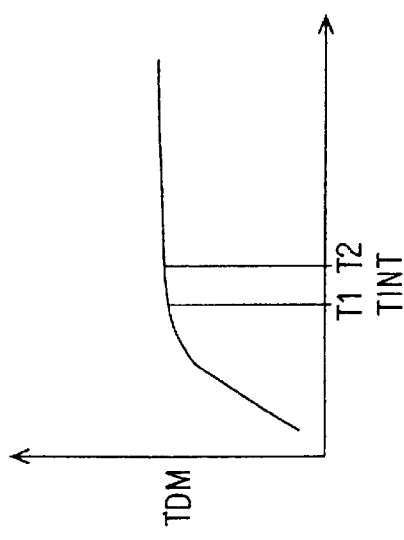
FIG. 12 is a graph showing a relation between the interval and the injection delay time (first embodiment)
Figure 13:
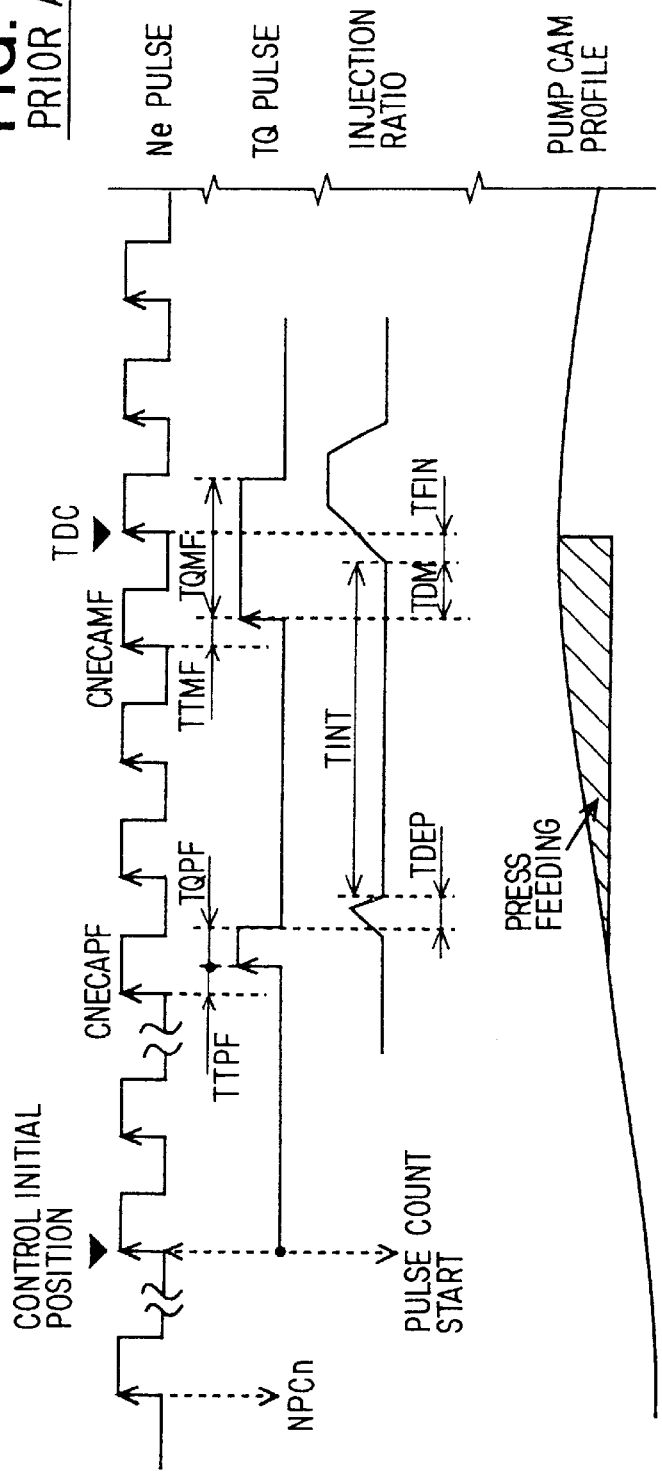
FIG. 13 is a timing chart of multiple injections (prior art)

Further, as shown in FIG. 12, when the interval TINI is shortened, the injection delay time TDM abruptly changes due to the remnant magnetism in the injection control valve 3. That is, while the rotation speed changes or is in transition, when the actual interval TINT is smaller than the interval TINT calculated by ECU 11, the injection amount abruptly increases because the main injection period TQMF is the same therebetween.

According to the present embodiment, the redundant angle control and the time control are switched from each other in accordance with the interval amount TINT. As shown in FIG. 11, the pilot injection timing pulse number CNECAPF is adjusted the same as the main injection timing pulse number CNECAMF, and the main injection timing delay time TTMF controls the energizing start, thereby suppressing the fluctuation of the interval TINT due to the rotation fluctuation, which causes the abrupt injection amount change.

As shown in FIG. 10, the redundant angle control independently controls the injection timing in accordance with the pilot injection timing pulse number CNECAPF and the main injection timing pulse number CNECAMF. According to the redundant angle control, the rotation fluctuation and the Ne pulse amplitude from the rotation number sensor 12 fluctuation influence on the actual interval. However, the actual injection timing with respect to the top dead center TDC is not so influenced.

On the other hand, as shown in FIG. 11, the time control commonly controls the pilot injection timing pulse number CNECAPF and the main injection timing pulse number CNECAMF to be the same as each other. According to the time control, the rotation fluctuation and the Ne pulse amplitude from the rotation number sensor 12 fluctuation influence on the actual injection timing with respect to the top dead center TDC. However, the actual interval is not so influenced.

As described above, according to the present embodiment, since the injection period is calculated based on the injection timing fuel pressure, the injection period can be attained based on the actual fuel pressure at the injection timing. Thus, the difference between the calculated injection amount and the actual injection amount is reduced even at the transition driving. Further, since the provisional injection period is calculated, and the injection period is calculated again when the injection timing fuel pressure is correctly detected, the injection amount does not abruptly change even when the fuel pressure is not correctly detected.

According to the present embodiment, since the injection period is calculated based on the injection timing fuel pressure at each injection timing of the multiple injections, the difference between the calculated injection amount at each injection and the actual injection amount is reduced. Further, the switching means switches the controls in accordance with the interval, thereby suppressing the interval fluctuation due to the rotation fluctuation.

(Second Embodiment)

A fuel injection control of the ECU 11 in the present embodiment will be explained with reference to FIGS. 14–16.

The ECU 11 determines which cylinder injects a fuel at this routine (STEP 100). This STEP 100 is provided for reading a correction ΔPC of a same kind cylinder corresponding to the cylinder determined at this routine at following steps (for example, STEP 150) after STEP 100. The correction ΔPC is read from a memory in the ECU 11. The correction ΔPC is calculated at STEP 260 (described after) and the like at fuel injection timing of previous routine, and is saved into the memory.

Figure 23A:
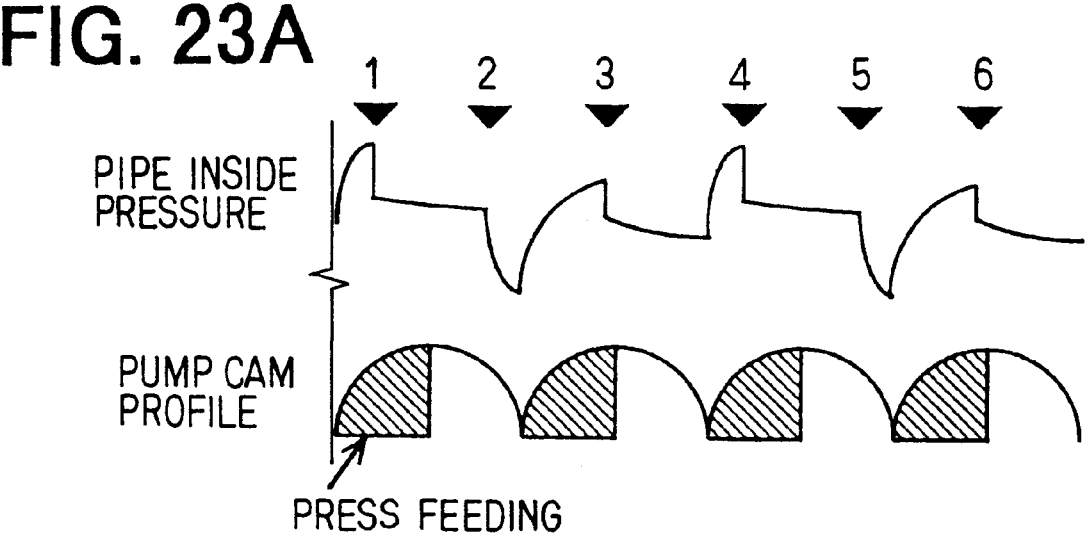
FIG. 23A explains same kind cylinders at two press-feedings and three injections (second embodiment)
Figure 23B:
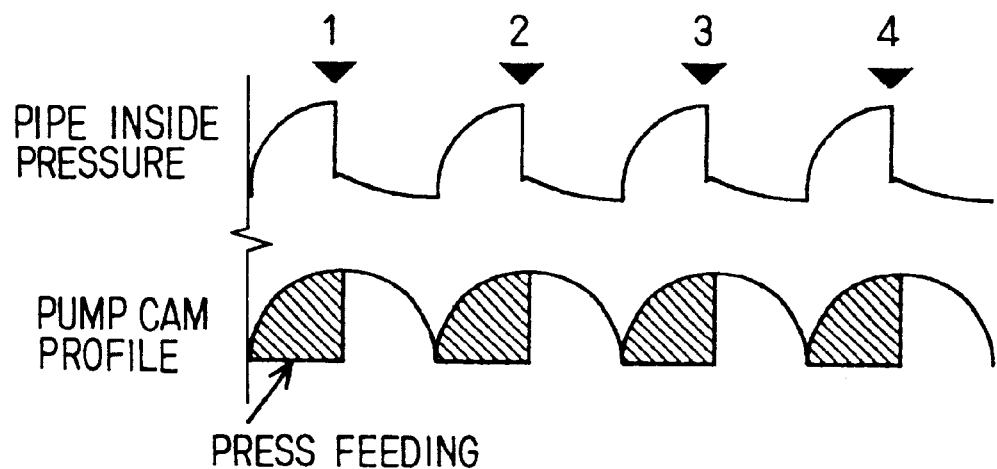
FIG. 23B explains same kind cylinders at one press-feeding and one injection (second embodiment)
Figure 24:
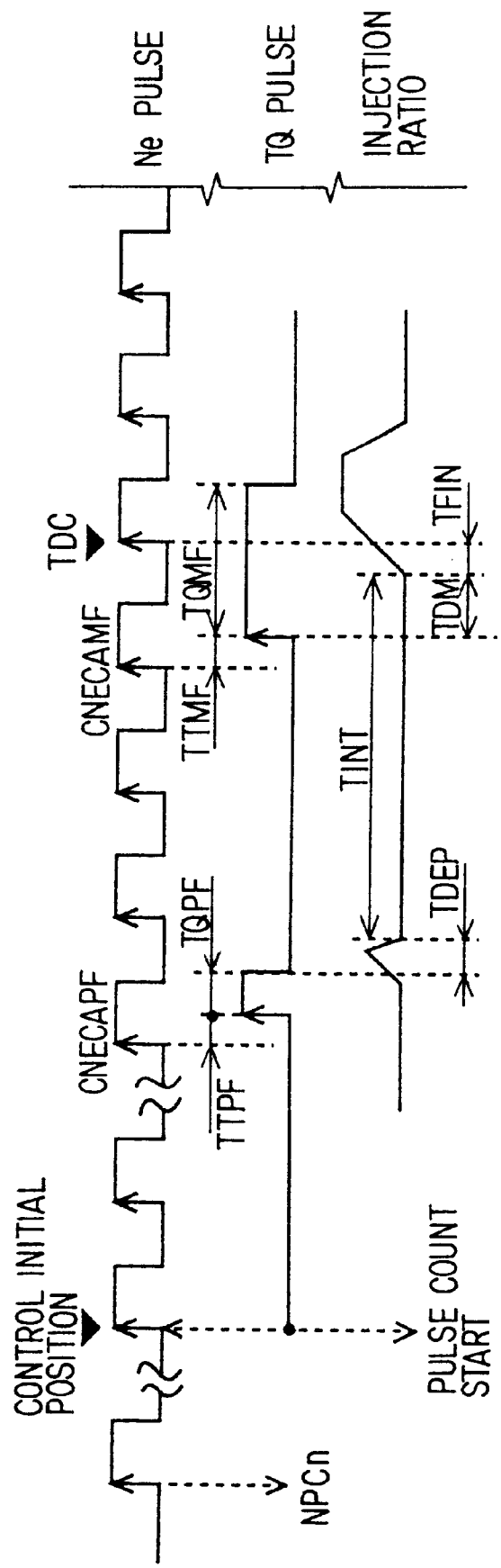
FIG. 24 is a timing chart of multiple injections (prior art).

The same kind cylinder will be explained hereinafter. As shown in FIG. 23, when the engine 1 includes six cylinders and the high-pressure supply pump 7 press-feeds the fuel four times while a crank shaft rotates twice (two press-feedings, three injections), fuel injection timings and fuel feeding timings are different among first through sixth cylinders. When these timings are different, the injection timing fuel pressures inside the accumulating pipe 4 are extremely different among each cylinder. When the fuel injection timing is the same as the fuel feeding timing, the fuel pressures substantially become the same. Thus, the ECU 11 determines that the first, second, and third cylinders are the same kind as the fourth, fifth, and sixth cylinders, respectively. Here, the ECU 11 may determine that only common cylinder is the same kind cylinder. On the other hand, as shown in FIG. 23, when the engine 1 includes four cylinders and the high-pressure supply pump 7 press-feeds the fuel four times (one press-feeding, one injection), fuel injection timings and fuel feeding timings are the same among each cylinder. In this case, the ECU 11 determines that all cylinders are the same kind cylinders.

After STEP 100, the ECU 11 determines which it should execute main injection only or multiple injections in which pilot injection is carried out before the main injection (STEP 102). When the ECU 11 determines it should do main injection only, the flow goes to STEP 105. The ECU 11 determines whether it is a predetermined fuel pressure detecting position (position before the top dead center by K° CA) or not based on the output signal of the rotation number sensor 12. When it is not the fuel pressure detecting position, the ECU 11 waits until it becomes the position. When it is or becomes the fuel pressure detecting position, a rotation number Ne is input into the ECU 11 through the rotation number sensor 12, and an accelerate opening degree Accp is input into the ECU 11 through the accelerate opening degree sensor 13 (STEP 110). Here, K° CA is set at 40° CA, for example.

The ECU 11 calculates a command injection amount QFIN based on the rotation number Ne and the accelerate opening degree Accp in accordance with a predetermined program and a characteristic map (not illustrated) (STEP 120). Similarly, the ECU 11 calculates a command injection timing TFIN based on the rotation number Ne and the command injection amount QFIN by using a characteristic map (STEP 130). A fuel pressure NPCn inside the accumulating pipe 4 is input into the ECU 11 through the pressure sensor 14 (STEP 140). Here, a suffix "n" denotes a current detected data at this routine. Hereinafter, only main injection flow will be described.

In this flow, after that, the correction in the memory is input into the ECU 11 hereinafter (STEP 150). When the engine 1 starts, the correction is initialized to "0" when it is used in adding/subtracting correction, or initialized to "1" when it is used as multiplier. First, a calculation example will be explained. In this example, an anticipated pressure NPCF is calculated based on the fuel pressure NPCn at STEP 140 by using the adding/subtracting correction as following expressions (STEP 160).

$$NPCF = NPCn + \Delta PC_{n-1}$$

$$\Delta PC_{n-1} = NPCM_{n-1} - NPC_{n-1}$$

(which is attained at STEP 260 of previous routine)

Here, $\Delta PC_{n-1}$ is a correction calculated at STEP 260 of previous routine. This correction is saved in the memory corresponding to the same kind cylinder as the current cylinder based on the cylinder determined at STEP 100. That is, among a cylinder group having same pressure pattern, the correction is read at the same cylinder group. Further, $NPC_{n-1}$ is a fuel pressure at STEP 140 of previous routine, and $NPCM_{n-1}$ is a injection timing fuel pressure at STEP 250 (described after) of previous routine.

The correction $\Delta PC_{n-1}$ corresponding to the difference between $NPC_{n-1}$ and $NPCM_{n-1}$ is almost the same at this routine whether at normal or transitional driving. Thus, the anticipated pressure NPCF is calculated by considering the correction $\Delta PC_{n-1}$ to reduce an error at an injection timing of this routine.

As described above, it may be corrected by using the multiplier. In this case, it is corrected by using a ratio between the injection timing fuel pressure NPCM and the fuel pressure as following expressions.

$$NPCF = K_{n-1} \times NPC_n$$

$$K_{n-1} = NPCM_{n-1} / NPC_{n-1}$$

(which is calculated at STEP 260 of previous routine)

Figure 17:
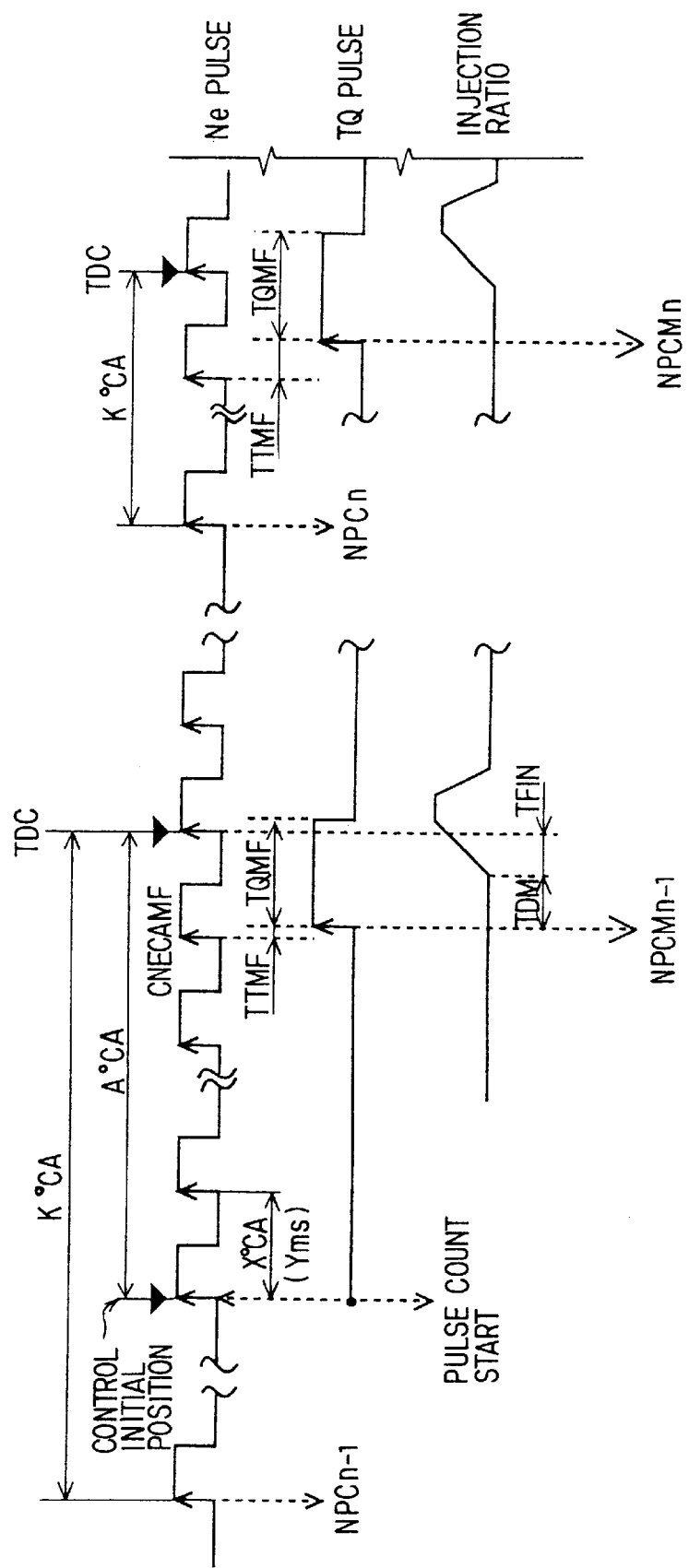
FIG. 17 is a timing chart of the fuel injection (second embodiment)
Figure 20:
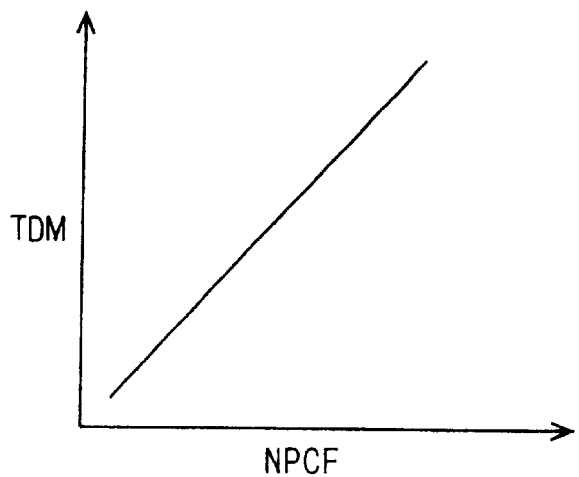
FIG. 20 is a graph showing a relation between an anticipated pressure and an injection delay time (second embodiment)

Next, the ECU 11 calculates a injection delay time TDM based on the anticipated pressure NPCF in accordance with a characteristic map in FIG. 20 (STEP 170). The injection delay time TDM is, as shown in FIG. 17, a period from the ECU 11 starts to energize the injector 2 until the fuel is actually injected. In the injector 2, since the fuel pressure acts on the needle to open the nozzle, the injection delay time varies in accordance with the fuel pressure. The characteristic map can be made by experiments to attain a relation between the fuel pressure and the injection delay time.

An injection timing is calculated based on the command injection timing TFIN at STEP 130 and the injection delay time TDM at STEP 170 (STEP 180). The injection timing is, as shown in FIG. 17, attained from an injection timing pulse number CNECAMF from a control initial position until just before an injection start timing, and a redundant time TTMF from this pulse until the injection start timing.

$$(A-TFIN)/X=CNECAMF+Z$$

$$(Z/X) \times Y-TDM=TTMF$$

If TTMF <0, the following step is executed.

$$CNECAMF=CNECAMF-1$$

$$TTMF=TTMF+Y$$

Here, CNECAMF is an integral number, and Z is a redundant. As shown in FIG. 17, A is an angle from the control initial position to a top dead center TDC, and X is an angle corresponding to one pulse output from the rotation number sensor 12. Y is a time while the engine rotates by the angle X by the rotation speed at that time.

Figure 21:
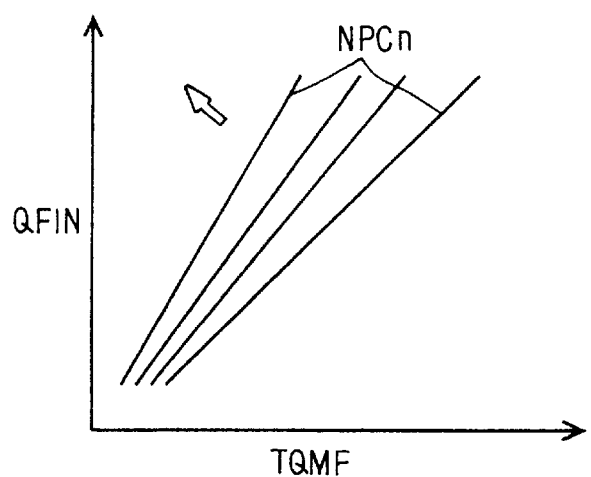
FIG. 21 is a graph showing a relation among an injection period, a fuel pressure, and a command injection amount (second embodiment)

Next, the ECU 11 calculates an injection period TQMF based on the command injection amount QFIN and the anticipated pressure NPCF in accordance with a characteristic map in FIG. 21 (STEP 190). The ECU 11 determines whether it is the control initial position or not based on the output signal from the rotation number sensor 12 (STEP 200). When it is not the control initial position, the ECU 11 waits until it becomes the control initial position. When it is or becomes the control initial position, the ECU 11 starts to count pulses output from the rotation number sensor 12 (STEP 210).

The ECU 11 determines whether the counted pulse number reaches the injection timing pulse number CNECAMF or not (STEP 220). When the counted pulse number does not reach the injection timing pulse number CNECAMF, the ECU 11 waits until it reaches the injection timing pulse number CNECAMF. When it is or reaches the injection timing pulse number CNECAMF, the ECU 11 determines whether the injection timing redundant time TTMF has passed or not (STEP 230).

The ECU 11 waits until the injection timing redundant time TTMF has passed, and when the injection timing redundant time TTMF has passed, the ECU 11 starts to energize the injector 2 (STEP 240). By this, the fuel pressure acts on the needle in the injector 2 to open the nozzle.

When the ECU 11 starts to energize the injector 2, i.e., when the main injection is started, an injection timing fuel pressure NPCMn is input into the ECU 11 (STEP 250). The ECU 11 calculates the correction ΔPCn or Kn based on the NPCMn and the fuel pressure NPCn at STEP 140 by using following expressions.

$$\Delta PCn=NPCMn-NPCn$$

$$Kn=NPCMn/NPCn$$

The ECU 11 save the correction ΔPCn or Kn into the memory for the fuel injection of and after next routine (STEP 260).

The ECU 11 determines whether the injection period TQMF has passed or not (STEP 270). The ECU 11 waits until the injection period TQMF has passed, and when the injection period TQMF has passed, the ECU 11 stops energizing the injector 2 (STEP 280). By this, the fuel pressure acts on the needle in the injector 2 to close the nozzle, and the fuel injection is finished. After STEP 280, the present fuel injection control is completed. In the present embodiment, a control means of the present invention executes the fuel injection control, and a correction calculation means executes the STEPS 250 and 260.

Figure 15:
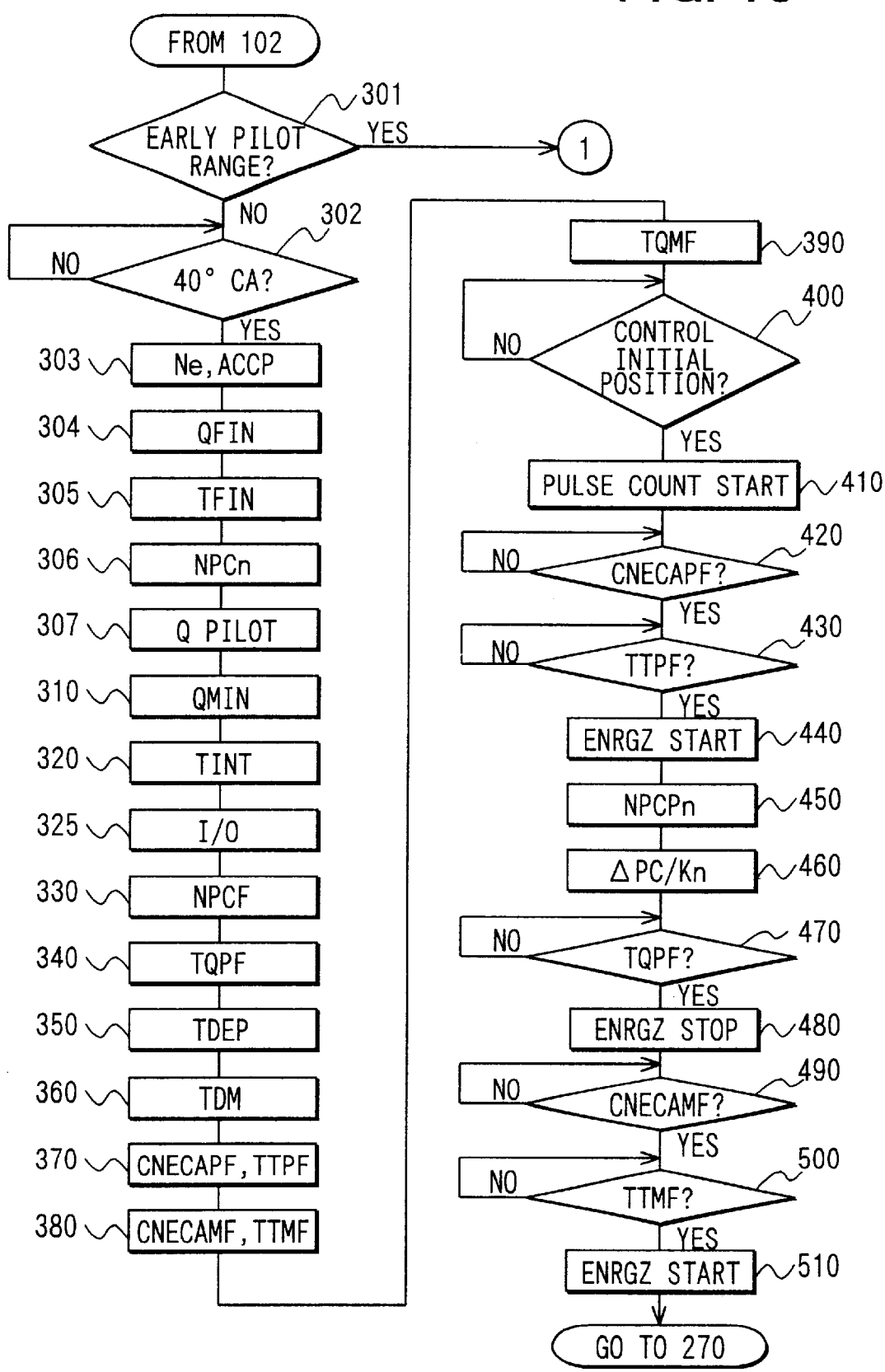
FIG. 15 is a flow chart showing a normal pilot range of a multiple injections control (second embodiment)
Figure 16:
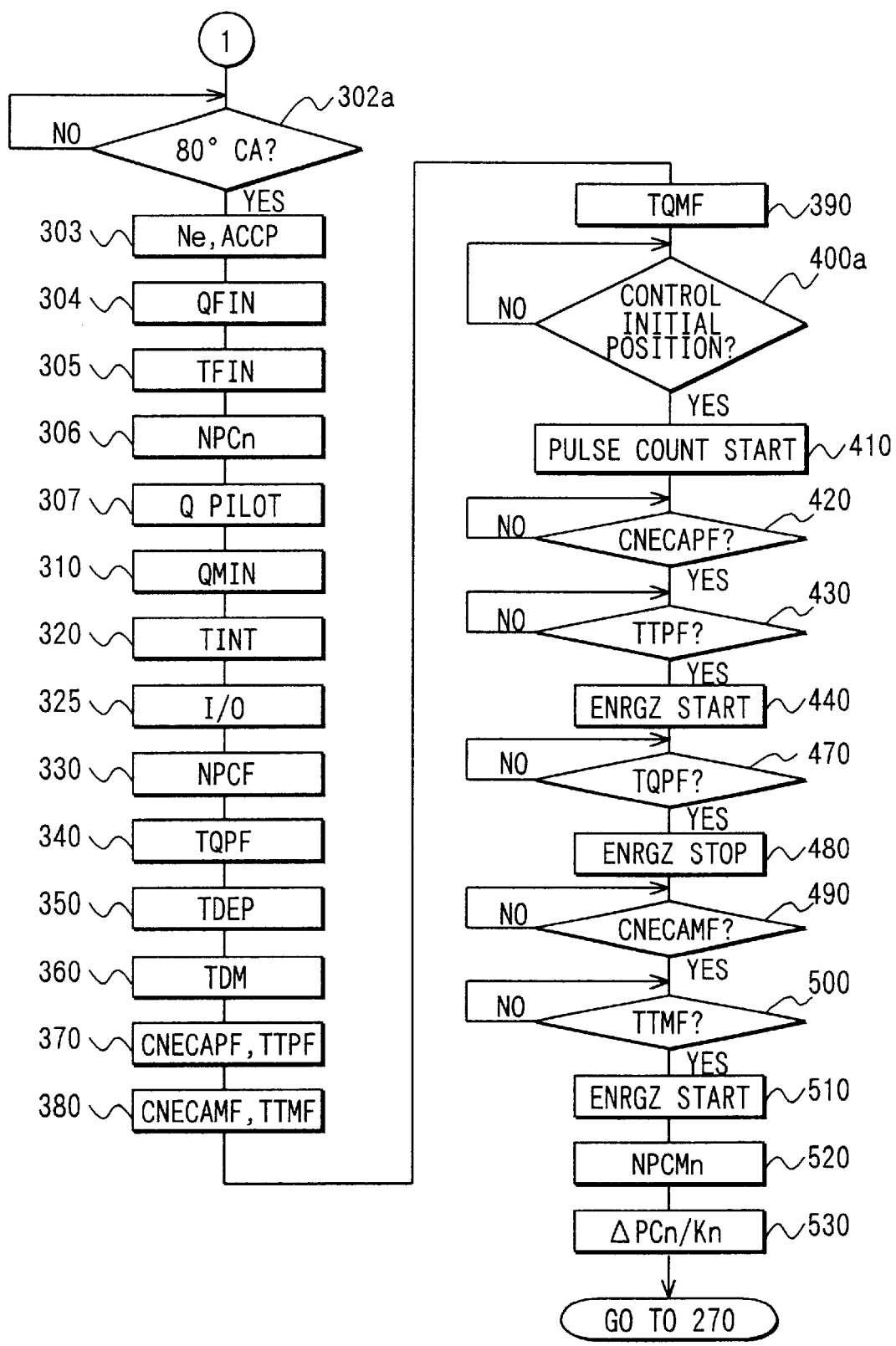
FIG. 16 is a flow chart showing an early pilot range of the multiple injections control (second embodiment)

When the ECU 11 determines it should execute the multiple injections at STEP 102, the flow goes to STEP 300 where the multiple injections control shown in FIGS. 15 and 16 is executed. Further, the ECU 11 determines whether it is within an early pilot range or a normal pilot range based on the driving condition of the engine 1 (STEP 301). In the early pilot range control, the pilot injection is carried out more than a predetermined interval before the main injection. In the normal pilot range control, the pilot injection is carried out within the predetermined interval before the main injection.

In general, the normal pilot range control is executed at a low speed range, so that an engine emission and an engine noise are reduced. At the low speed range, especially when an engine lord is high or low, the early pilot control reduces the engine emission and the engine noise more effectively. Thus, according to the present embodiment, the ECU 11 divides the multiple injection controls into the early pilot range control and the normal pilot range control at STEP 301. Here, the early pilot injection is executed at about 70° CA before the top dead center (TDC).

Figure 19:
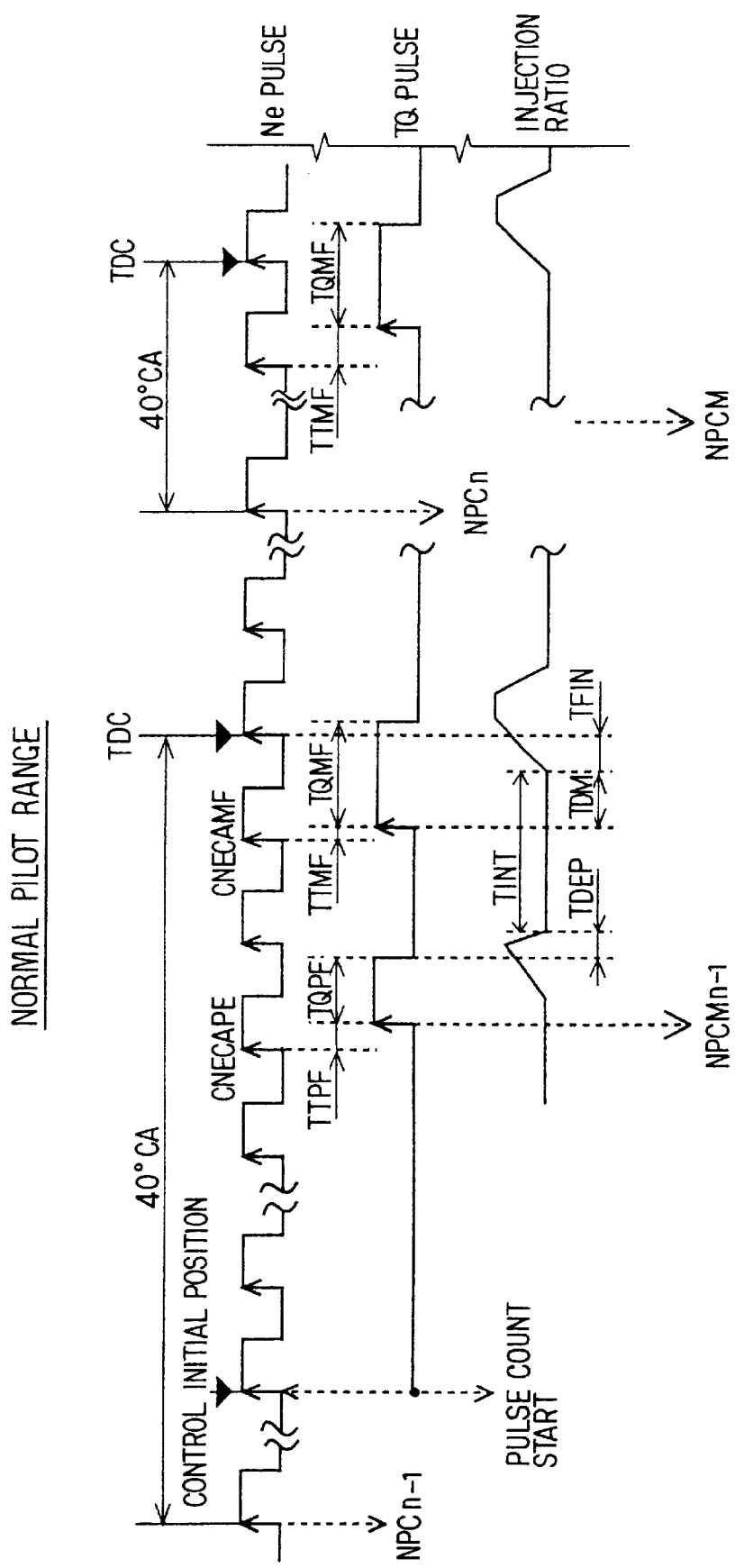
FIG. 19 is a timing chart of the normal pilot range (second embodiment)

When the ECU 11 determines it is within the normal pilot range, the flow goes to STEP 302. At STEP 302, as in the only main injection flow, the ECU 11 determines whether it is a predetermined fuel pressure detecting position or not based on the output signal from the rotation number sensor 12. The fuel injection detecting position is, as shown in FIG. 19, positioned at 40° CA before the top dead center TDC. When it is not the fuel pressure detecting position, the ECU 11 waits until it becomes the position. When it is or becomes the fuel pressure detecting position, a rotation number Ne is input into the ECU 11 through the rotation number sensor 12, and an accelerate opening degree Accp is input into the ECU 11 through the accelerate opening degree sensor 13 (STEP 303).

The ECU 11 calculates a command injection amount QFIN based on the rotation number Ne and the accelerate opening degree Accp in accordance with a predetermined program and a characteristic map (not illustrated) (STEP 304). Similarly, the ECU 11 calculates a command injection timing TFIN (STEP 305). A fuel pressure NPCn inside the accumulating pipe 4 is input into the ECU 11 through the pressure sensor 14 (STEP 306)

The ECU 11 attains a pilot injection amount QPILOT by using a characteristic map (not illustrated) (STEP 307). The ECU 11 calculates a main injection amount QMIN by subtracting the pilot injection amount QPILOT from the command injection amount QFIN at STEP 304 (STEP 310).

$$QMIN=QFIN-QPILOT$$

Figure 22:
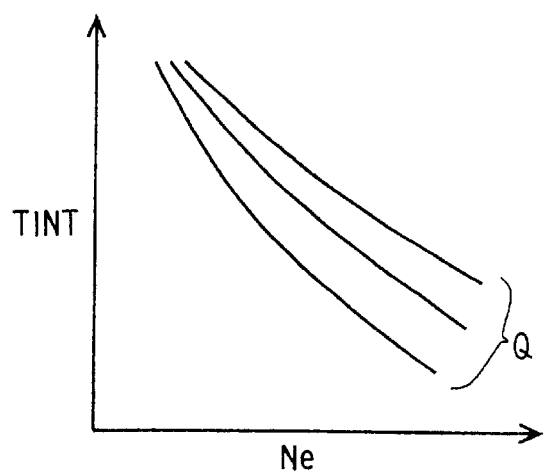
FIG. 22 is a graph showing a rotation number, an injection amount, and an interval (second embodiment)

Next, the ECU 11 attains an interval TINT (see FIG. 19) between the pilot injection and the main injection based on the rotation number Ne and the command injection amount QFIN in accordance with a characteristic map in FIG. 22

(STEP 320). The ECU 11 calculates an anticipated pressure NPCFM by following expression (STEPS 325, 330).

$$NPCF=NPCn+\Delta PC_{n-1}$$

Here, NPCn is the fuel pressure inside the accumulating pipe 4 at STEP 306, $\Delta PC_{n-1}$ is the correction calculated at STEP 460 of one previous routine.

As described above, it may be corrected by using the multiplier. In this case, it is corrected by using a ratio between the injection timing fuel pressure NPCM and the fuel pressure NPC as following expressions.

$$NPCF=K_{n-1} \times NPC_n$$

$$K_{n-1}=NPCM_{n-1}/NPC_{n-1}$$

(which is calculated at STEP 460 of previous routine)

Next, the ECU 11 calculates a pilot injection period TQPF based on the anticipated pressure NPCFP at STEP 330 and the pilot injection amount QPILOT at STEP 305 in accordance with a characteristic map similar to the map in FIG. 21 (not illustrated) (STEP 340).

The ECU 11 calculates a pilot injection completion delay time TDEP based on the anticipated pressure NPCF and the pilot injection amount QPILOT in accordance with a characteristic map (not illustrated) (STEP 350). The pilot injection completion delay time TDEP is defined as a time from the injection control valve 3 is disenergized until the fuel injection from the injector 2 is actually completed. After that, the ECU 11 calculates a main injection delay tine TDM based on the anticipated pressure NPCF in accordance with a characteristic map in FIG. 20 (STEP 360).

Figure 18:
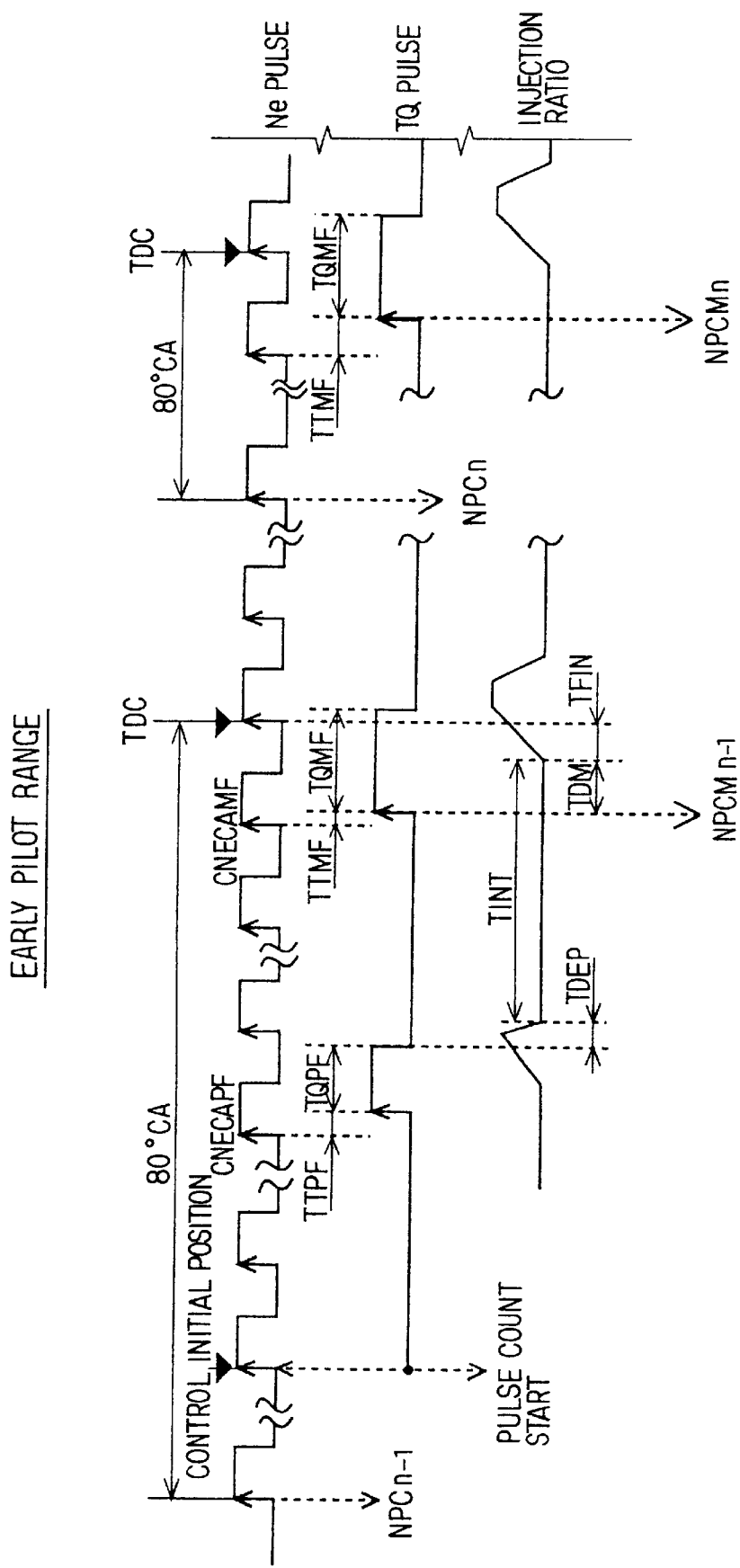
FIG. 18 is a timing chart of the early pilot range (second embodiment)

The ECU 11 calculates a pilot injection timing pulse number CNECAPF and a pilot injection timing redundant time TTPF based on the command injection timing TFIN, the interval TINT, the pilot injection completion delay time TDEP, and the pilot injection period TQPF at STEP 340 (STEP 370). This calculation is, as shown in FIG. 18, done by the same way as in STEP 180 based on the top dead center TDC as criteria.

After that, the ECU 11 calculates a main injection timing pulse number CNECAMF and a main injection timing redundant time TTMF based on the command injection timing TFIN and the main injection delay time TDM (STEP 380). This calculation is also done by the same way as in STEP 180 based on the top dead center TDC as criteria.

The ECU 11 calculates a main injection period TQMF based on the main injection amount QMAIN at STEP 310 and the anticipated pressure NPCF at STEP 330 in accordance with a characteristic map similar to the map in FIG. 21 (STEP 390). The ECU 11 determines whether the pulse detected by the rotation number sensor 12 is the control initial position, i.e., the pulse count start position, or not (STEP 400). When the pulse is not the control initial position, the ECU 11 waits until it becomes the control initial position.

When it is or becomes the control initial position, the ECU 11 starts to count the pulse number from the control initial position (STEP 410). The ECU 11 determines whether the pulse number reaches the pilot injection timing pulse number CNECAPF or not (STEP 420). When it does not reach the pilot injection timing pulse number CNECAPF, the ECU 11 waits until it reaches CNECAPF. When it is or reaches CNECAPF, the ECU 11 determines whether the pilot injection timing redundant time TTPF has passed or not (STEP 430).

When the pilot injection timing redundant time TTPF has not passed, the ECU 11 waits until it has passed. When the pilot injection timing redundant time TTPF has passed, the ECU 11 starts to energize the injector 2 (STEP 440). By this, the needle in the injector 2 opens the nozzle to start the pilot injection. Here, a pilot injection timing fuel pressure NPCPn inside the accumulating pipe 4 at this time is input into the ECU 11 through the pressure sensor 14 (STEP 450). The ECU 11 calculates the correction APC or Kn based on the pilot injection timing fuel pressure NPCPn and the fuel pressure NPCn at STEP 306 by using following expressions, and saves the correction $\Delta PC$ or Kn into a predetermined memory (STEP 460).

$$\Delta PCn=NPCPn-NPCn$$

$$Kn=NPCPn/NPCn$$

The ECU 11 determines whether the injection period TQPF has passed or not (STEP 470). The ECU 11 waits until the injection period TQPF has passed, and when the injection period TQPF has passed, the ECU 11 stops energizing the injector 2 (STEP 480). By this, the needle in the injector 2 closes the nozzle, and the pilot fuel injection is finished.

The ECU 11 determines whether the counted pulse number reaches the injection timing pulse number CNECAMF or not (STEP 490), and whether the injection timing redundant time TTMF has passed or not (STEP 500). The ECU 11 waits until the counted pulse number reaches the injection timing pulse number CNECAMF, and until the injection timing redundant time TTMF has passed. When the injection timing redundant time TTMF has passed, the ECU 11 starts to energize the injector 2 (STEP 510). By this, the needle in the injector 2 lifts up to open the nozzle to execute the main injection.

Figure 14:
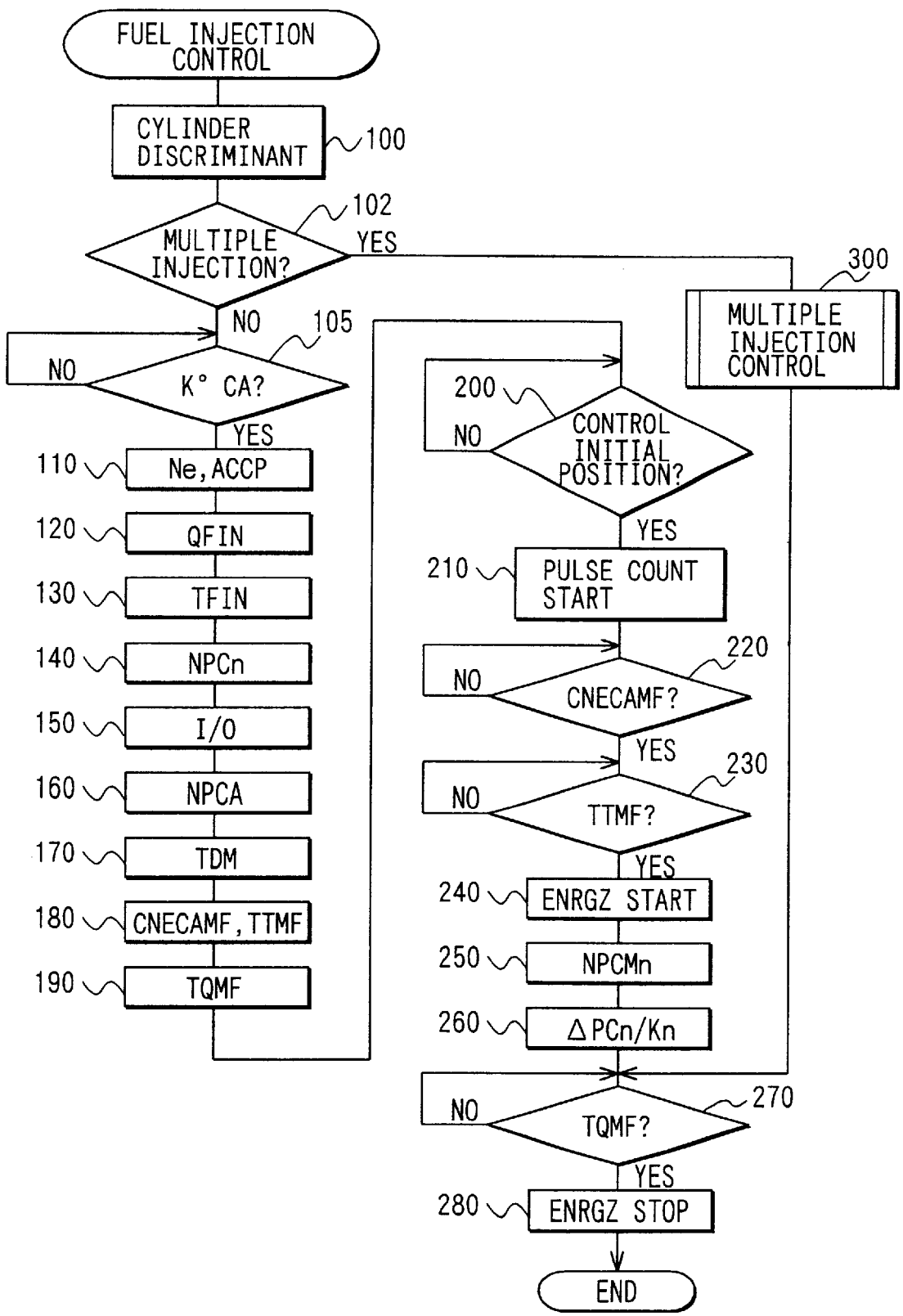
FIG. 14 is a flow chart showing a fuel injection control (second embodiment)

Next, the flow returns to STEP 270 in FIG. 14, the ECU 11 determines whether the injection period TQMF has passed or not. When the injection period TQMF has passed, the ECU 11 stops energizing the injector 2 (STEP 280). By this, the needle in the injector 2 closes the nozzle, and the main fuel injection is finished. After STEP 280, the present control is completed.

When the ECU 11 determines it is within the early pilot range at STEP 301, the ECU 11 determines whether it is a fuel pressure detecting position (STEP 302a). As in the STEP 302, the ECU 11 determines whether it is the predetermined fuel pressure detecting position or not based on the output signal from the rotation number sensor 12.

At this fuel pressure detecting position, the pilot injection is executed, before the main injection, earlier than STEP 302 in the normal pilot range control. Thus, as shown in FIG. 18, the fuel pressure detecting position is set at 80° CA before the top dead center TDC.

When it is not the fuel pressure detecting position, the ECU 11 waits until it becomes the position. When it is or becomes the fuel pressure detecting position, the ECU 11 starts to energize the injector 2 as in STEPS 303–440 (STEPS 303–440).

The predetermined control initial position determined at STEP 400a is changed more before than the control initial position determined at the normal pilot range control (STEPS 200, 400). At this STEP, the ECU 11 determines whether it becomes this changed control initial position or not.

By this STEP 440, the needle in the injector 2 opens the nozzle to execute the early pilot injection. The ECU 11 determines whether the injection period TQPF has passed or not (STEP 470). The ECU 11 waits until the injection period TQPF has passed, and when the injection period TQPF has passed, the ECU 11 stops energizing the injector 2 (STEP 480). By this, the needle in the injector 2 closes the nozzle, and the early pilot injection is finished.

The ECU 11 determines whether the counted pulse number reaches the injection timing pulse number CNECAMF or not (STEP 490), and whether the injection timing redundant time TTMF has passed or not (STEP 500). The ECU 11 waits until the counted pulse number reaches the injection timing pulse number CNECAMF, and until the injection timing redundant time TTMF has passed. When the injection timing redundant time TTMF has passed, the ECU 11 starts to energize the injector 2 (STEP 510). By this, the fuel pressure acts on the needle in the injector 2 to lift up to open the nozzle to execute the main injection.

As in above-described STEPS 250 and 260, the main injection timing fuel pressure NPCMn inside the accumulating pipe 4 is input into the ECU 11 through the pressure sensor 14 (STEP 520). The ECU 11 calculates the correction $\Delta PCn$ or $Kn$ based on the NPCMn and the fuel pressure NPCn by using following expressions.

$$\Delta PCn = NPCMn - NPCn$$

$$Kn = NPCMn / NPCn$$

The ECU 11 saves the correction $\Delta PCn$ or $Kn$ into a predetermined memory (STEP 530).

Next, the flow returns to STEP 270 (see FIG. 14), the ECU 11 determines whether the injection period TQMF has passed or not. When the injection time TQMF has passed, the ECU 11 stops energizing the injector 2 (STEP 280). By this, the needle in the injector 2 closes the nozzle, and the main fuel injection is finished. After STEP 280, the present control is completed.

In this way, as shown in FIG. 19, the anticipated pressure NPCF is calculated by detecting the pilot injection timing fuel pressure NPCPn when the normal pilot range control is executed. Further, as shown in FIG. 18, the anticipated pressure NPCF is calculated by detecting the main injection timing fuel pressure NPCPn when the early pilot range control is executed, as in the range where the only main injection is executed.

Since a pressure fluctuation influence inside the accumulating pipe 4 is reduced after the pilot injection within the early pilot range, the fuel pressure inside the accumulating pipe 4 is input into the ECU 11 at the main injection to improve the injection amount control accuracy. Therefore, timing when the injection fuel pressure is input in the early pilot range is different from that in the normal pilot range.

On the other hand, since an interval between the pilot injection and the main injection is small within the normal pilot range, the pressure fluctuation influence inside the accumulating pipe 4 is large after the pilot injection. Thus, when the fuel pressure inside the accumulating pipe 4 at the main injection is input, the injection amount control accuracy is not improved. That is, the pressure fluctuation influence is avoided by inputting the fuel pressure at the pilot injection. Further, since the interval is small, the fuel pressure inside the accumulating pipe 4 is almost the same from the pilot injection through the main injection, thereby improving the injection amount control accuracy.

As described above, the correction is calculated based on the injection timing fuel pressure, the anticipated pressure is calculated based on the correction, and the injection period is calculated based on the anticipated pressure. Thus, the difference between the calculated injection period and the actually required injection period (injection period in accordance with actual injection pressure) is reduced even at the transition period. Further, since the ECU 11 determines whether the current cylinder is the same kind cylinder or not, the difference between the calculated injection period and the actual injection period is reduced even when the number of cylinders is different from the number of fuel feedings.

What is claimed is:

1. A fuel injection apparatus comprising:

an injector injecting fuel;

a pressure accumulating pipe accumulating high-pressure fuel therein, and supplying the high-pressure fuel to said injector;

a fuel pressure detecting means for detecting fuel pressure inside said pressure accumulating pipe; and a control means for controlling said injector to inject the fuel, wherein said control means calculates an injection timing of said injector based on the detected fuel pressure, and said control means calculates an injection period based on an injection timing fuel pressure at the injection timing.

2. A fuel injection apparatus according to claim 1, wherein said fuel pressure detecting means detects the injection timing fuel pressure inside said accumulating pipe at the injection timing, and said control means calculates a current injection period based on the injection timing fuel pressure at the injection timing.

3. A fuel injection apparatus according to claim 2, wherein said control means further calculates a provisional injection period based on the detected fuel pressure, said fuel pressure detecting means detects the injection timing fuel pressure inside said accumulating pipe at the injection timing, said control means calculates again a current injection period based on the injection timing fuel pressure when the injection timing fuel pressure is correctly detected.

4. A fuel injection apparatus according to claim 2, wherein said fuel pressure detecting means detects the injection timing fuel pressure at the injection timing at each injection timing of multiple injections, and said control means calculates a current injection period based on the injection timing fuel pressure.

5. A fuel injection apparatus according to claim 2, wherein said control means calculates a command injection amount, said fuel pressure detecting means detects the injection timing fuel pressure at the injection timing, and said control means calculates a current injection period based on the injection timing fuel pressure and the command injection amount.

6. A fuel injection apparatus according to claim 2, wherein said control means includes a switching means for switching a calculation of injection timing of a main injection, based on a fuel injection interval of multiple injections.

7. A fuel injection apparatus according to claim 1, further including a correction calculating means for calculating a correction based on the fuel pressure and the injection timing fuel pressure, wherein said fuel pressure detecting means detects the injection timing fuel pressure at the injection timing, said control means calculates an anticipated pressure based on the fuel pressure and the correction, and said control means calculates the injection period based on the anticipated pressure.

8. A fuel injection apparatus according to claim 7, wherein said fuel pressure detecting means detects the injection timing fuel pressure at a main injection timing when an early pilot range control of multiple injections is executed, and said correction calculating means calculates the correction based on the fuel pressure and the injection timing fuel pressure.

9. A fuel injection apparatus according to claim 7, wherein said fuel pressure detecting means detects the injection timing fuel pressure at a pilot injection timing when a normal pilot range control of multiple injections is executed, and said correction calculating means calculates the correction based on the fuel pressure and the injection timing fuel pressure.

10. A fuel injection apparatus according to claim 7, wherein the correction is calculated at the injection timing of one previous cylinder.

11. A fuel injection apparatus according to claim 7, wherein the correction is calculated at one previous injection timing.

12. A fuel injection apparatus according to claim 7, further including a high-pressure supply pump within said pressure accumulating pipe, said high-pressure supply pump press feeding the fuel by different times from the number of cylinders, wherein said control means uses a correction of a cylinder in which fuel press feeding timing is the same as in a current cylinder, as one previous correction.

* * * * *